US009903976B2

(12) United States Patent
West et al.

(10) Patent No.: US 9,903,976 B2
(45) Date of Patent: Feb. 27, 2018

(54) SEMI-RIGID AIRBORNE ELECTROMAGNETIC TRANSMITTER ANTENNA SYSTEM

(71) Applicant: VALE S.A., Rio de Janeiro (BR)

(72) Inventors: Gordon Fox West, Toronto (CA); Peter Whyte Walker, Mississauga (CA); Benjamin David Polzer, Sudbury (CA)

(73) Assignee: VALE S.A., Rio de Janeiro (BR)

( * ) Notice: Subject to any disclaimer, the term of this patent is extended or adjusted under 35 U.S.C. 154(b) by 290 days.

(21) Appl. No.: 14/930,335

(22) Filed: Nov. 2, 2015

(65) Prior Publication Data
US 2017/0123093 A1 May 4, 2017

(51) Int. Cl.
| | |
|---|---|
| *G01V 3/16* | (2006.01) |
| *G01V 3/165* | (2006.01) |
| *G01V 3/28* | (2006.01) |
| *G01V 3/08* | (2006.01) |
| *G01V 3/26* | (2006.01) |
| *G01V 3/18* | (2006.01) |

(52) U.S. Cl.
CPC .............. *G01V 3/165* (2013.01); *G01V 3/08* (2013.01); *G01V 3/18* (2013.01); *G01V 3/26* (2013.01); *G01V 3/28* (2013.01); *G01V 3/081* (2013.01); *G01V 3/083* (2013.01); *G01V 2003/084* (2013.01)

(58) Field of Classification Search
CPC ... G01V 3/18; G01V 3/26; G01V 3/28; G01V 2003/084; G01V 3/08; G01V 3/081; G01V 3/083; G01V 3/10
USPC ........ 324/327, 332, 333, 338, 346, 351, 376
See application file for complete search history.

(56) References Cited

U.S. PATENT DOCUMENTS

| | | | |
|---|---|---|---|
| 2008/0211506 A1* | 9/2008 | Klinkert ............ | H01Q 1/28 324/330 |
| 2015/0048834 A1* | 2/2015 | Allen ................ | G01V 3/081 324/336 |
| 2016/0306066 A1* | 10/2016 | Izarra .............. | G01V 3/165 |

* cited by examiner

*Primary Examiner* — Jermele M Hollington
*Assistant Examiner* — Raul Rios Russo
(74) *Attorney, Agent, or Firm* — Arent Fox LLP

(57) ABSTRACT

An apparatus for airborne electromagnetic surveying is provided, comprising a central hub defining an equatorial plane, a transmitter loop, and radials connecting the hub to the transmitter loop. The loop generally lies in a plane during flight, and comprises loop sections, some of which are connected with flexible joints allowing the loop to flex out of the plane during lift-offs and landings. A loop section comprises current conducting elements connected to current conducting elements of adjacent loop sections forming a transmitter loop circuit. A radial connects to the hub at a point that is substantially offset from the transmitter loop plane, thereby contributing to the stability of the transmitter loop connection point in an up-down direction relative to the hub. Additionally, a loop section comprising rigid conductive elements retained in a spaced-apart relationship by a frame member is also provided.

23 Claims, 18 Drawing Sheets

US 9,903,976 B2

SEMI-RIGID AIRBORNE ELECTROMAGNETIC TRANSMITTER ANTENNA SYSTEM

FIELD OF THE DISCLOSURE

The present disclosure relates generally to active airborne electromagnetic (AEM) systems, and more particularly to an airborne antenna system.

BACKGROUND

Active airborne electromagnetic (AEM) systems are used to map and detect geological features in the ground according to their varied electrical conductivity. Many metal ore deposits are more electrically conductive than their host rocks, and AEM surveys have been successful in many regions of the world in helping discover new ore resources. An AEM system may include equipment that is carried on or towed by an aircraft. The aircraft and AEM equipment are flown over the ground to be investigated.

An active AEM system generally comprises a transmitter and a receiver. The transmitter creates a primary field to induce eddy currents the Earth which may be detected with the receiver. The transmitter usually comprises a loop of one or more electrically conductive turns through which an electrical current is driven to create the primary magnetic field. The electrical current of the loop, which is time-varying and is usually given a periodic waveform, is supplied by a transmitter driver module that is energized by an electrical power source on or carried by the aircraft. The resulting primary magnetic field surrounds and extends away from the transmitter loop; its intensity diminishing rapidly with distance from the loop. The primary magnetic field cuts through conductive ground and induces eddy currents in the ground. The eddy currents generate their own secondary magnetic field, which may be detected using the receiver sensor of the AEM system. The receiver sensor may comprise a magnetometer, or any sensor for detecting a magnetic field or its change. The received signals provide information about the geometrical distribution and extent of electrical conduction in the earth under the AEM system.

The receiver is usually located close to the transmitter, at a point where the primary magnetic field is enormously stronger than typical secondary fields. Therefore, an AEM system must generally provide means for the receiver to detect and separate whatever weak secondary field reaches the receiver location from the primary field.

There are at least two approaches for performing the primary-secondary separation. One approach involves attempting to annul the primary field of transmitter at the location of the receiver sensor by bucking or angular orientation. A second approach involves limiting the secondary measurements to an "off-time" interval in the primary current waveform, or by its frequency domain alternative of measuring only secondary components that are in quadrature phase with the primary field signal. Either method or variations of them may be employed, as alternatives or in combination.

The maximum depth at which a deposit of a given size, conductivity and geometry may be detected depends on the strength of the transmitted signal. This is proportional to the dipole moment of the system, which is the product of the transmitter current, number of turns and area of the transmitter loop. The detection of deep deposits may be enhanced by using a larger transmitter dipole moment.

The frequency of the transmitted signal may be another consideration. AEM systems generally may need to use a lower (base) frequency to penetrate deeper into conductive ground. Production of a strong transmitter signal at low frequency generally requires a transmitter loop that is physically a large part of the whole flight system.

Receiver motion noise is usually a significant consideration in increasing the sensitivity of an AEM system for low frequencies (e.g. below 20 Hz). Approaches to reduce noise at the receiver include vibration isolation systems for receiver sensors, and increasing of the signal by increasing the dipole moment of the loop by some combination of increasing its size, number of turns, peak current, and duty cycle. However, increasing the dipole moment of the loop may compromise the other desirable characteristics of an AEM system by affecting one or more of: the geometric stability of the receiver sensors, the dynamic range of the receiver, the primary-secondary field separation, the stability of flight, the ability to safely land and take off with the transmitter loop, or the ability of the loop to be transported from site to site.

Since AEM systems induce currents to flow in the ground by electromagnetic induction as described by Faraday's Law, in general as frequencies are lowered, the secondary fields will become weaker relative to the primary field. Thus, when a large primary field is present relative to the scattered field, such as is the case when low frequencies are employed, it may be advantageous to annul the primary field with one or more auxiliary coils. Such bucking (or "annulment") has the advantage of permitting the sensor to be operated with a greater sensitivity than would otherwise be possible. Bucking may further enable better detection of weak fields by diminishing any stray currents induced in the region of the receiver which may be a source of noise. When bucking is used to boost the sensitivity to weak fields, rigid geometries between the bucking coils, the receiver sensors and the transmitter loop are generally preferred.

However, an increase in the size of a transmitter loop for producing strong transmitter signals at low frequencies generally comes with an increase in weight. An increase in the size or weight of a transmitter loop may pose some challenges in an AEM system, such as limiting the types of aircraft that may be used, limiting the maximum flight velocity of the system, and increasing the total aerodynamic drag on the system in-flight.

SUMMARY

In at least one aspect, the present disclosure is directed to an apparatus for airborne electromagnetic surveying, the apparatus comprising: a rigid central hub having a vertical extent and defining an equatorial plane; a transmitter loop disposed around the rigid central hub; a plurality of radials connecting the rigid central hub and the transmitter loop, a distal end of each radial being connected to the transmitter loop at a transmitter loop connection point and a proximal end of each radial being connected to the hub at a hub connection point; the transmitter loop comprising: a plurality of substantially rigid loop sections connected in an end-to-end manner with joints, wherein a plurality of the joints are flexible joints and the loop sections are disposed to lie in a transmitter loop plane during flight and may flex out of the transmitter loop plane at the flexible joints during lift-offs and landings, wherein, each loop section comprises one or more current conducting elements electrically connected to current conducting elements in an adjacent loop section to collectively form a transmitter loop circuit into which current may be driven by a transmitter, and wherein the proximal end of at least one radial connects to a hub connection point that is substantially offset from the transmitter loop plane along the vertical extent of the rigid central hub, whereby the offsetting contributes to the stability of the transmitter loop connection point in an up-down direction relative to the equatorial plane of the hub, and wherein the transmitter loop plane and the equatorial plane of the hub are substantially parallel during flight.

In at least another aspect, the present disclosure is directed to a loop section for forming part of an apparatus for airborne electromagnetic surveying, the loop section comprising: a plurality of rigid conductive elements extending between first and second ends of the section, the conductive elements capable of conducting electrical current; at least one frame for securely retaining the rigid conductive elements in a spaced apart relationship, the frame comprising non-conductive material for providing electrical isolation between the rigid conductive elements; and a section terminator connected to a frame and extending from an end the loop section for connecting to an adjacent loop section at a joint.

BRIEF DESCRIPTION OF THE DRAWINGS

The present disclosure will be better understood having regard to the drawings in which.

DETAILED DESCRIPTION

Figure 1A:
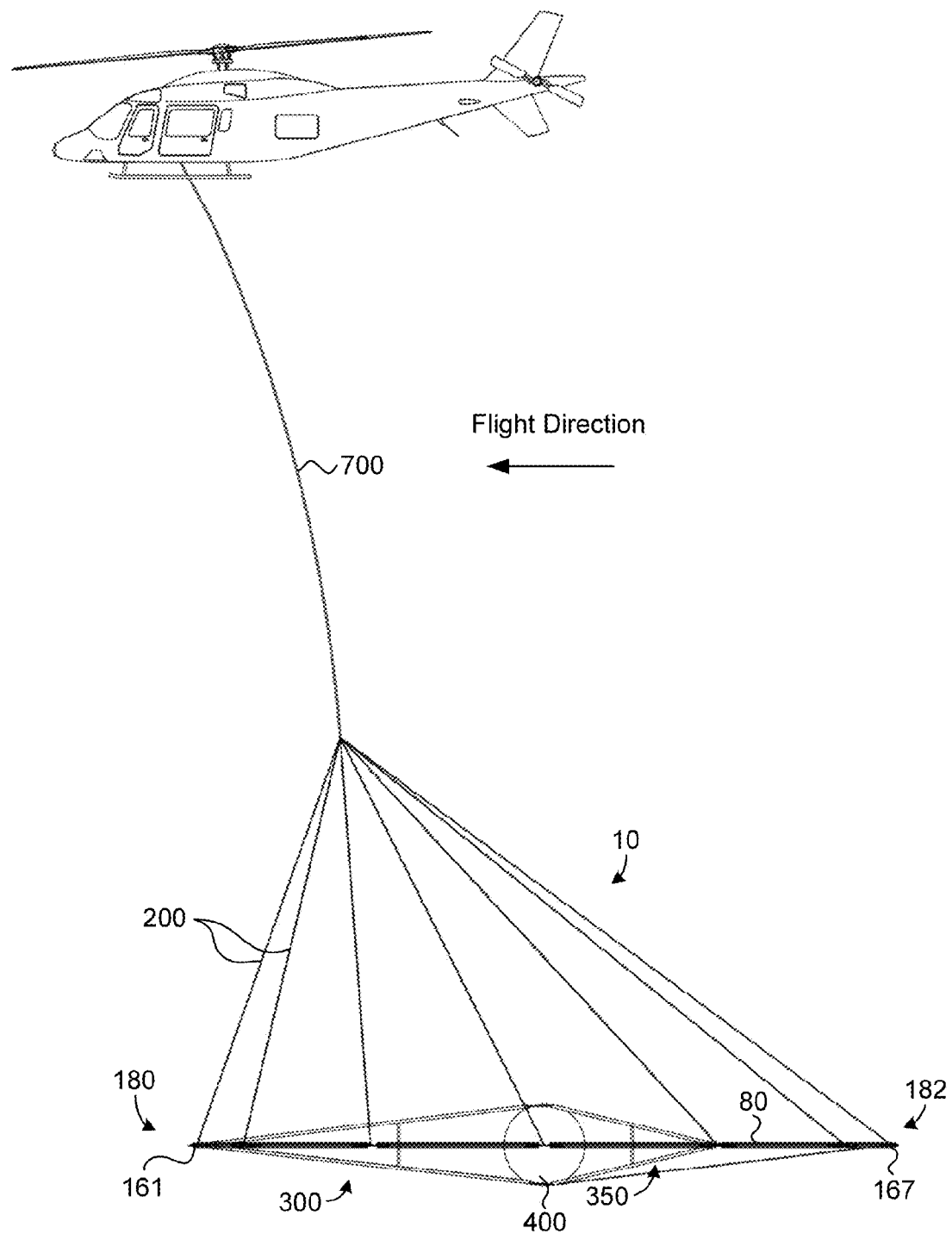
FIG. 1A is a side view of an electromagnetic transmitter antenna system according to the present disclosure being towed through the air by an aircraft.

A large, multi-turn transmitter loop may be utilized to provide a sufficient dipole moment to detect conductive earth deposits (e.g. ore) located deep below the surface. For example, a loop having a root mean square (RMS) dipole moment of 1,000,000 Am2 or more may be required. A loop and its related AEM system need to be sufficiently light to be supported by or towed using an aircraft.

An AEM system may be improved by increasing its geometrical stability. A geometrically stable system will produce a more consistent magnetic field within the Earth and at the receiver of the AEM system, lowering the noise and uncertainties associated with geometrical changes of the coupling of the system to the ground, as well as the noise associated with the changes in the transmitted moment, and changes of the primary magnetic field at the receiver. By lowering the noise of the system, its sensitivity to deep deposits may be increased.

A transmitter loop that is rigid during flight may be used. A rigid loop may maintain a stable primary magnetic field at the location of the sensor system which may be at the centre of the loop. In addition, a rigid loop may permit the attitude of the loop to be aerodynamically trimmed to create a known and stable primary magnetic field with respect to the ground.

In addition, a transmitter loop that is flexible to allow for some deformation to prevent damage to the loop during liftoffs and landings may be used. In addition, a flexible loop may be able to conform to uneven ground to relieve stresses on the loop when it is resting on the ground.

Furthermore, a transmitter loop may comprise connectable sections to allow for its assembly and disassembly in the field. This enables a disassembled loop to be transportable by truck or other standard commercial conveyance thereby facilitating economy of usage.

A large, multi-turn loop for such an AEM system may be constructed with a number of sections each comprising several parallel, low-resistance rigid current conducting (conductive) elements. The loop may be assembled by connecting the sections in an end-to-end manner, and rigid conductive elements in adjacent loop sections may be electrically interconnected with flexible electrical connectors so as to provide a continuous transmitter loop circuit for generating a primary magnetic field. The conductive elements in a loop section may be separated and set in fixed positions relative to one another. This may lower the impedance of the transmitter loop circuit at high frequencies and make it easier for the current in the circuit to execute rapid transitions in amplitude. In addition, the separated and fixed positions of the rigid conductive elements may reduce parasitic eddy currents induced on each conductor by its neighbouring elements.

Therefore according to at least one aspect, the present disclosure is directed to an electromagnetic transmitter antenna system comprising a transmitter loop made of several flexibly interconnected rigid sections that together surround a rigid central structure called the hub. The rigid central hub may contain one or more receiving sensors and may serve as a structural anchor point for the loop. The loop may exhibit flexibility during assembly, liftoff and landing, but also exhibit rigidity in flight such that while in flight, the plane formed by the sections of the transmitter loop (the transmitter loop plane) is approximately aligned with an equatorial plane defined by the hub. Mechanical flexibility may be achieved by interconnecting at least some adjacent loop sections with flexible joints. In some embodiments, the flexibility may be provided by hinged joints.

Rigidity during flight may be achieved by using flexible joints that permit only specific types of articulation between some or all of the loop sections and by use of specific kinds of structural connection to the rigid central hub. The hub may provide hub connection points for attaching radials that connect the hub to the transmitter loop at transmitter loop connection points. The proximate end of a radial is connected to the hub at a hub connection point and the distal end of a radial is connected to the loop at the transmitter loop connection point. In at least one embodiment, a transmitter loop connection point may be located at a joint that forms a vertex of the transmitter loop. The radials may be flexible (e.g. ropes) or they may be rigid spars (e.g. tubes or beams).

Rigidity of the system may be enhanced by providing a hub with a significant or substantial vertical extent above or below the equatorial plane of the hub. By virtue of its vertical extent, the hub may provide one or more attachment points for rigid radials on the hub that are sufficiently vertically offset from an equatorial plane of the hub that multiple rigid radials may form rigid radial truss structures connecting certain loop vertices to the hub.

The truss structure may comprise an upper spar with a proximate end attached to the hub at an upper hub connection point, and a lower spar with a proximate end attached to the hub at a lower hub connection point. The upper hub connection point may be located in an upper region of the hub, above the equatorial plane, and the lower hub connection point may be located in a lower region of the hub, below the equatorial plane. The truss structures constrain the position of the attached loop vertex relative to the hub and hence to the sensor system at the hub, with the vertical extent of the offsetting between the proximate connection points constraining the attached loop vertex in an up-down direction relative to the equatorial plane. The hub may also allow for the attachment of bucking coils located in its equatorial plane, thus providing a means of maintaining rigidity and optimum geometry between the sensor system, the bucking coils and select joints of the loop.

In at least one embodiment, the hub is a sphere or a low-drag shape approximating a sphere and the rigid radials are attached to rings or other attachment points on the sphere located significantly above and below the equatorial plane of the hub. Also, one or more rigid radials may be pivotably or extendably connected to the hub for allowing the transmitter loop to bend during liftoff and landing. In at least one embodiment, at least one radial, such as a forward-facing radial, may pivot relative to the hub in an upward or downward direction to allow the loop to bend, flex, or otherwise deform to relieve stresses produced in the AEM system during liftoff and landing.

Various features and components of the present disclosure are now described with reference to the Figures.

FIGS. 1A to 4 illustrate an embodiment of an electromagnetic transmitter antenna system 10 according to the present disclosure being towed through the air by an aircraft with tow cable 700. Electromagnetic transmitter antenna system 10 generally comprises a transmitter loop 80 comprising a plurality of transmitter loop sections 100 connected in an end to end manner. Some or all of the joints between adjacent loop sections 100 may be flexible joints to permit articulation between adjacent loop sections. In this sense, two adjacent loop sections 100 may be mechanically coupled to one another. Adjacent transmitter loop sections 100 may be electrically coupled to one another by way of one or more flexible conductors, such as flexible wires, which do not materially affect the mechanical flexibility of the flexible joints. A rigid central hub 400 may be disposed inwardly of loop 80 and may be connected to loop 80 with one or more radials, such as forward radial 300 and rear radials 350. The combination of radials 300, 350 and hub 400 may contribute to the stability of the shape of loop 80 so that the loop is maintained in its transmitter loop plane that is substantially parallel to the equatorial plane of the hub while it is airborne. The equatorial plane of hub 400 is a plane that approximately bisects the hub horizontally as indicated by dashed line 401 shown in FIG. 2.

Embodiments of the present disclosure are described as being used in combination with a helicopter. However, this is not intended to be limiting. Features and systems according to the present disclosure may be used in combination with any other suitable type of aircraft, including but not limited to a helicopter, a fixed wing aircraft, an airship, a zeppelin, a blimp, a gyrocopter, a vertical takeoff and landing (VTOL) aircraft, and an aerostat.

Transmitter loop sections 100 may comprise one or more conductors for carrying electric current in a transmitter circuit. Conductors of adjacent loop sections 100 may be electrically connected to form one or more independent or distinct transmitter circuits around loop 80 containing a plurality of turns so as to create a large magnetic moment when energized with current. Antenna system 10 may also comprise one or more transmitter drivers to provide amplified or controlled current for creating the primary magnetic field of each independent transmitter circuit, and one or more controllers to control or generate the waveform of the current driver. In addition, one or more receiver sensors may be positioned in a housing of hub 400. Furthermore, in some embodiments, antenna system 10 may comprise a bucking system for generating a magnetic field for annulling a primary magnetic field generated by the transmitter loop 80 at one or more receiver sensors. One or more bucking coils forming a bucking loop may be disposed at or near hub 400. The bucking system is not illustrated in the Figures.

In at least one embodiment, transmitter loop 80 may have a diameter of approximately 25 meters, may comprise twelve loop sections 100, and may have a seven turn transmitter loop circuit. However, these values and numbers are only examples and are not meant to be limiting.

Loop 80 may be connectable to tow cable 700 by way of a plurality of lift ropes, cables or other connectors 200 that may extend from spaced apart points around loop 80 to a lower end of tow cable 700. In some embodiments, a life rope, cable or other connector 201 may interconnect hub 400 to tow line 700 (see e.g. FIG. 1C). The lengths of the various lift ropes 200 may be selected so that when loop 80 is in flight at a predetermined speed or range of speeds, the aerodynamic drag acting on system 10 results in loop 80 being suitably oriented relative to the ground. In one embodiment, the lengths of ropes 200 may be chosen so that loop 80 is approximately horizontal to the ground during flight. An example towing speed is approximately 25 to 30 meters per second. However, other towing speeds may be used.

For descriptive purposes, antenna system 10 may be referred to as having a leading or forward end and a trailing or rear end. Leading end 180 and trailing end 182 are indicated in FIGS. 1A to 3. Antenna system 10 may also be referred to as having a leading section comprising the part of the antenna system which leads the hub in the flight direction, and a trailing section which trails the hub in the flight direction. Antenna system 10 may also comprise components referred to as having a proximate end that is closer to or in contact with hub 400, and a distal end that is closer to or in contact with transmitter loop 80.

Figure 2:
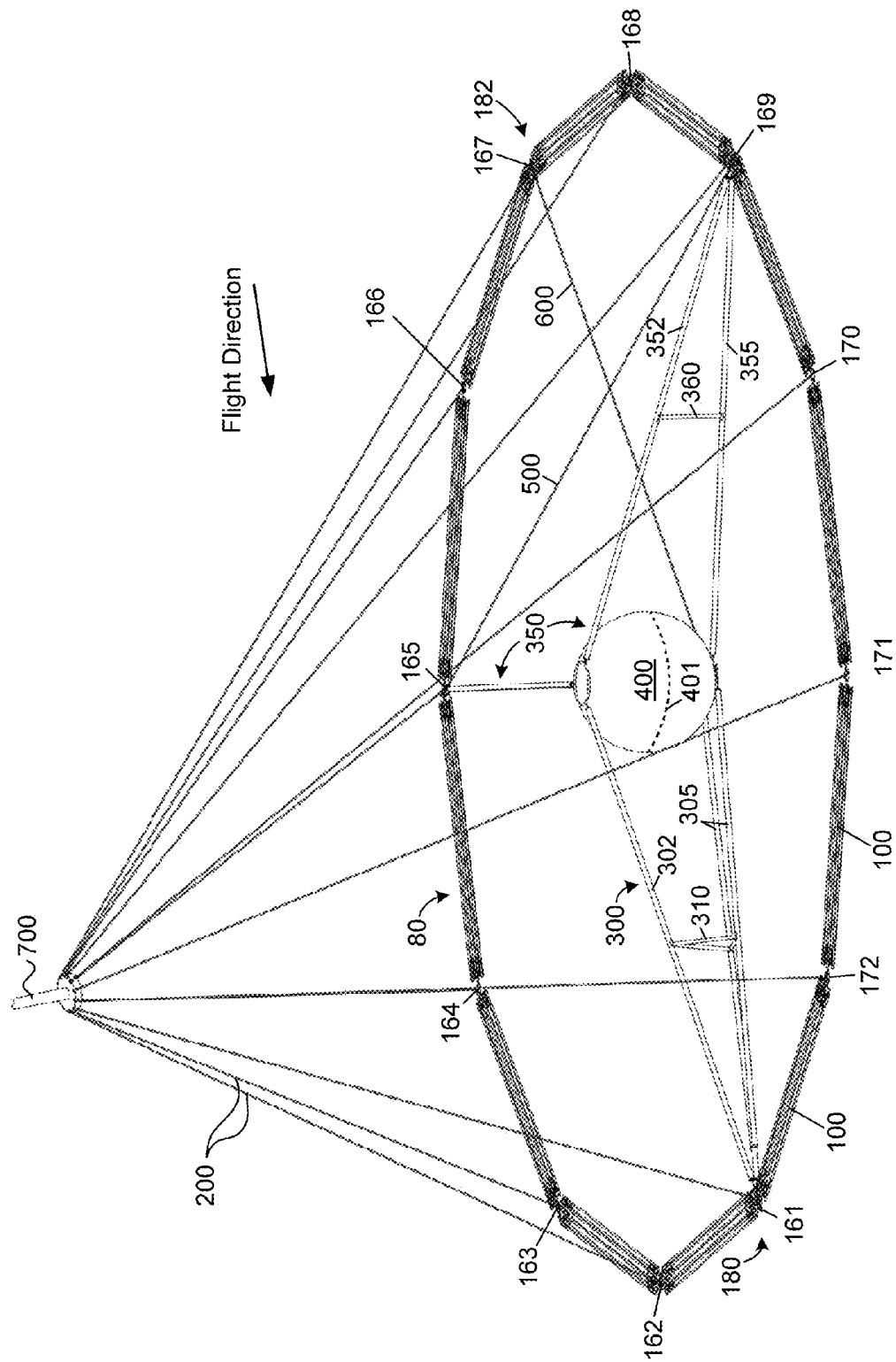
FIG. 2 is a perspective view of an embodiment of an electromagnetic transmitter antenna system while in flight.

Lift ropes 200 may connect to loop 80 at one or more joints 161-172 interconnecting adjacent loop sections 100 as indicated in FIG. 2. As shown in FIGS. 8, 9, 11A and 11B, a lift ring 150 to which a lift rope 200 may connect may be coupled to or form part of a joint. It is to be appreciated, however, that in other embodiments lift ropes 200 may connect to loop 80 at any other suitable location and in any other suitable way.

Figure 1B:
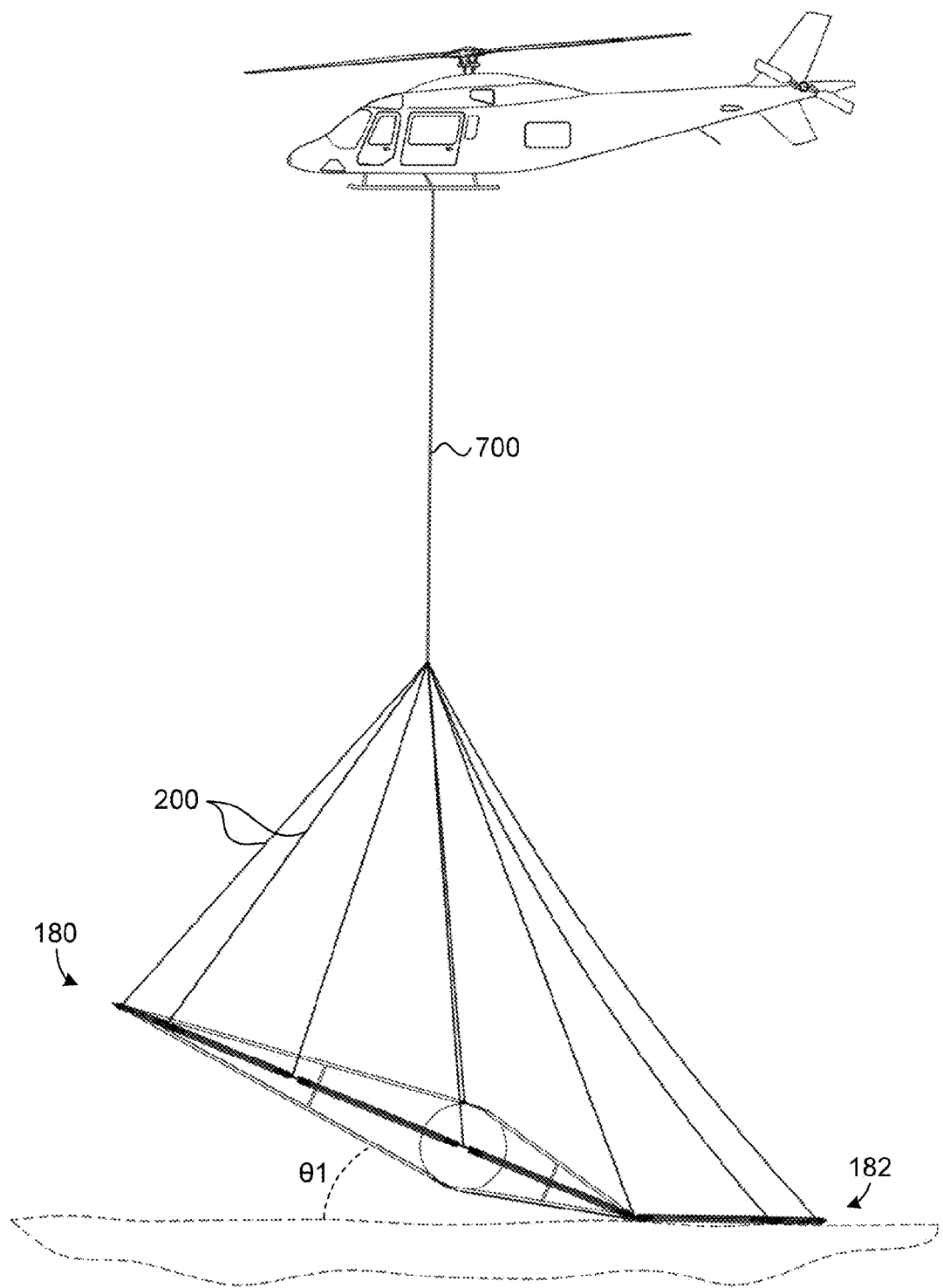
FIG. 1B is a side view of the antenna system of FIG. 1A being lifted from or laid on the ground by the aircraft.

As shown in FIG. 1B, when antenna system 10 is lifted off or laid on the ground, absent any drag, a plane of loop 80 forms an angle θ1 to the horizontal ground, causing the trailing end 182 of loop 80 to lie on the ground as the leading end 180 is lifted. Some of the shorter lift ropes 200 support the leading end 180 of loop 80 as the trailing end 182 lies on and conforms to the ground. Some of lift ropes 200 supporting trailing end 182 of the loop become slack as the weight of some loop sections 100 in trailing end 182 of the loop are borne by the ground. Loop 80 may deform to relieve stresses, including stress on its trailing end 182, to reduce the chance of damage to loop 80 during liftoff and landing.

Figure 1C:
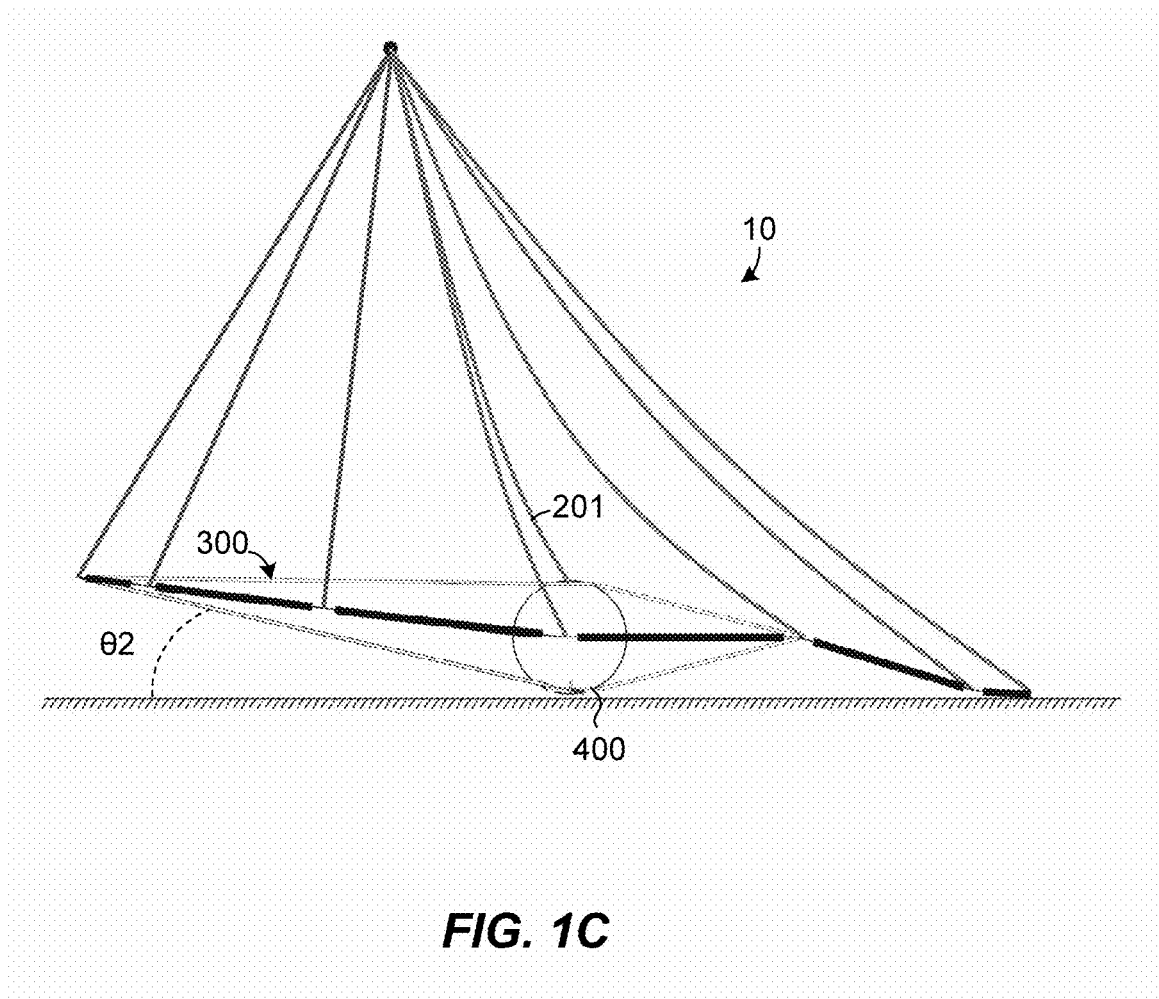
FIG. 1C is a side view of the antenna system in which a forward truss radial has been pivoted upwardly out of an equatorial plane of the hub.

In some embodiments, forward truss radial 300 may be capable of rotating or pivoting about hub 400 in an up/down direction relative to the equatorial plane of hub 400. Again, this may allow loop 80 to flex or otherwise deform to relieve stresses produced in system 10 during liftoff or landing. FIG. 1C is a side view of antenna system 10 in which forward truss radial 300 has pivoted upwardly out of equatorial plane of hub 400 indicated by θ2. Some of the shorter lift ropes 200 that support the leading end 180 of loop 80 are taught while some of lift ropes 200 supporting trailing end 182 of the loop are slack. As will be described below, in some embodiments, system 10 may include one or more biasing mechanisms to bias loop 80 to an in-flight configuration in which all loop sections lie more or less within the common plane of the equatorial plane of hub 400. Thus loop 80 may be capable of flexing or bending during liftoff and landing, and being biased into an in-flight configuration during flight.

Figure 4:
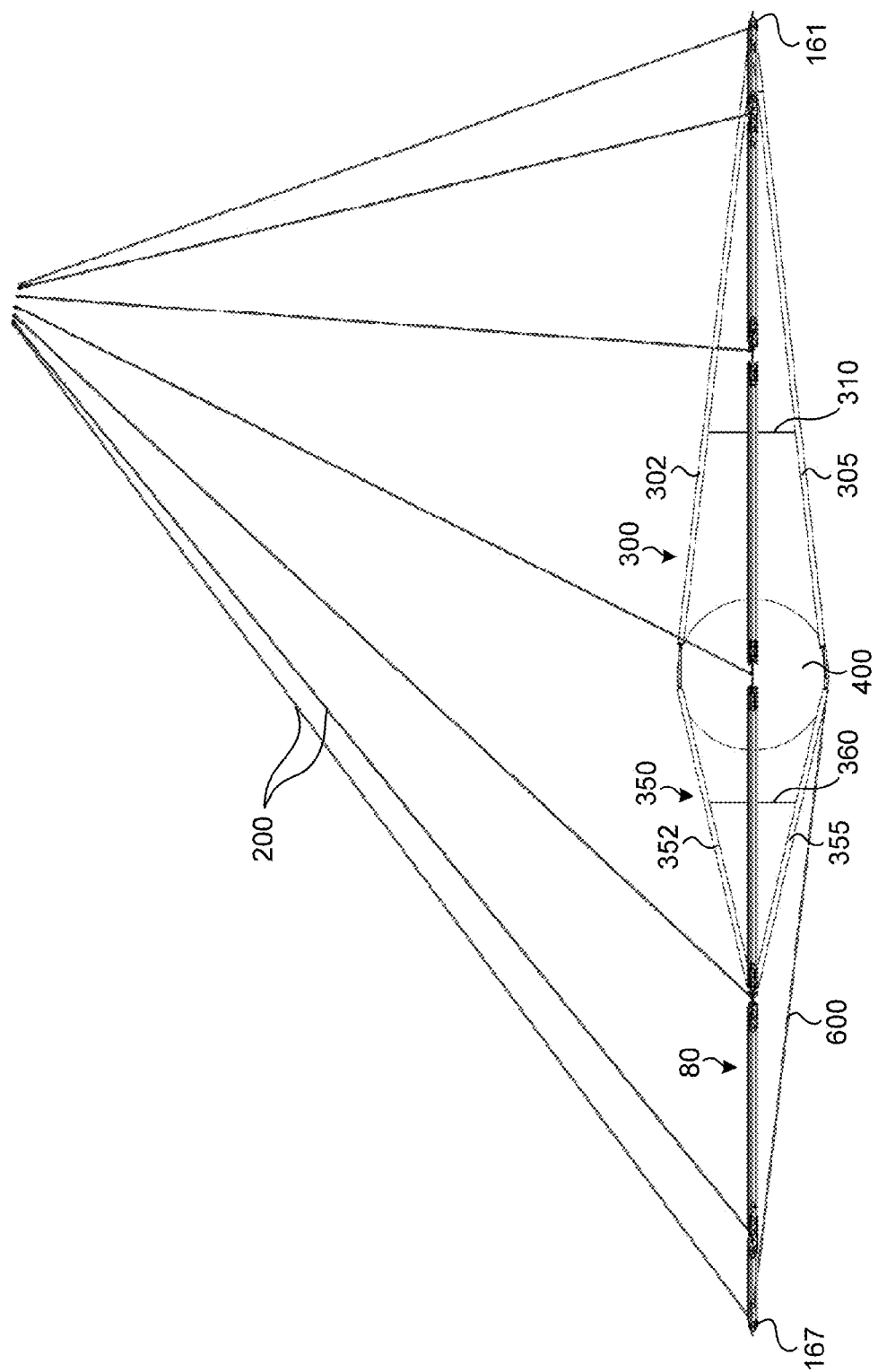
FIG. 4 is a side view of the antenna system of FIG. 2.

FIG. 2 is a perspective view of the electromagnetic transmitter antenna system 10 shown in FIG. 1A when the system is in flight and suspended from the tow cable 700. FIGS. 1A and 4 clearly show loop sections 100 and the centre point of the hub 400 located in a horizontal equatorial plane of hub 400. The plane defined by transmitter loop 80 (e.g. the transmitter loop plane) lies substantially in or substantially parallel to the equatorial plane of hub 400 apart from those instances when the loop is being lifted from or laid on the ground as depicted in FIG. 1B.

Transmitter loop sections 100 of loop 80 may be arranged in and end to end manner to form a closed polygonal ring shaped structure interconnected in any suitable manner, including with mechanical linkages that restrict flexibility in specific ways. One or more of the mechanical linkages may comprise a flexible joint allowing for certain rotations between two adjacent loop sections. In some embodiments, some of the joints have a single axis of rotation; that axis being substantially in the equatorial plane and substantially transverse to the axial directions of the loop sections that they conjoin. This may allow loop 80 to change shape, for instance, to accommodate bending stresses during liftoff and landing. As shown in the Figures, in at least one embodiment, sections 100 may be interconnected using flexible joints 161 to 172.

Loop 80 may be constructed using parts which may be amenable to assembly and disassembly, and may be of a size to be transportable by truck or other standard commercial conveyance. For instance, two or more loop sections 100 may be releasably connectable to one another for assembly and disassembly.

Loop Sections

Figure 8:
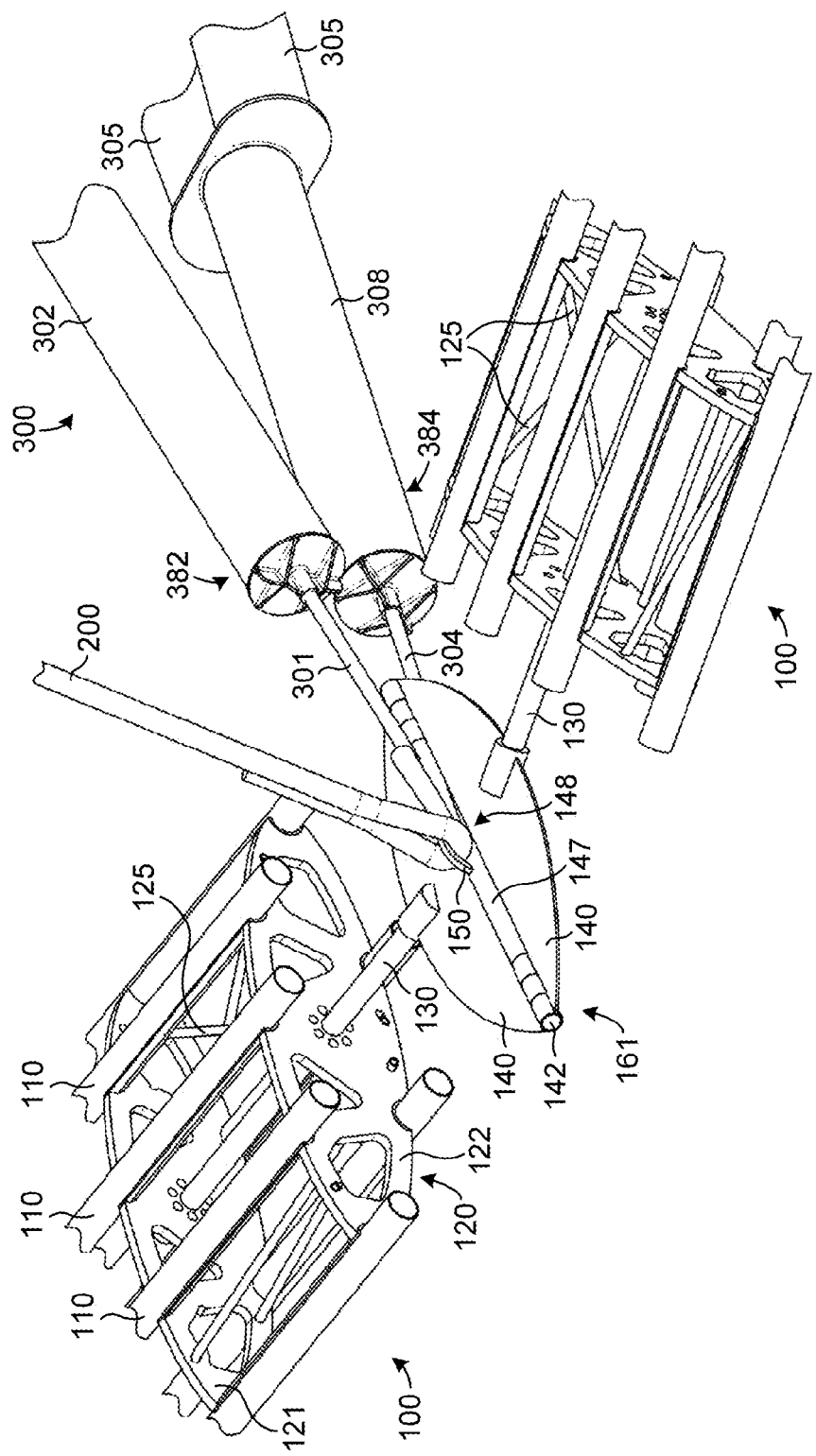
FIG. 8 is a perspective view at a leading joint region of a transmitter loop in an embodiment.
Figure 9:
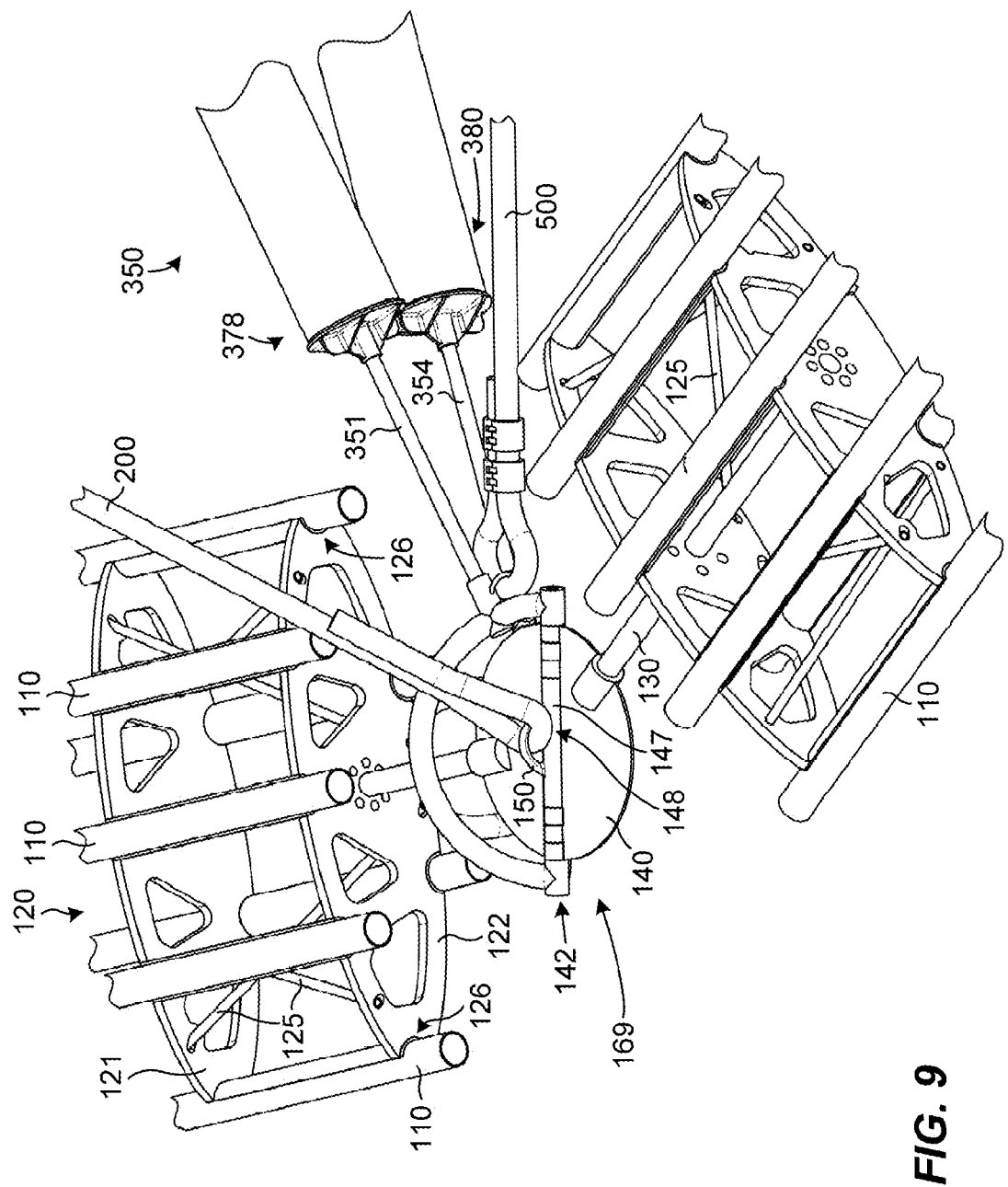
FIG. 9 is a perspective view at a joint region of a transmitter loop to which a rear radial is connected in an embodiment.

In some embodiments, as shown in FIG. 8 and FIG. 9, a loop section 100 may generally comprise one or more substantially rigid or rigid current carrying conductors or conductive elements 110, one or more frames 120, and one or more section terminators or shafts 130. FIG. 9 is a perspective view at a joint 169 of a transmitter loop to which a rear radial is connected.

Conductive elements 110 may have a tube-like structure and may comprise conductive material, such as aluminum. Tube shaped conductive elements 110 generally have the highest bending stiffness relative to their weight. Conductive elements 110 may provide both structural and current conducting functions. In one embodiment, elements 110 may be generally straight. However, in other embodiments (not shown), conductive elements 110 may be curved or of any other suitable shape or size, and combinations of straight and curved elements may be employed. Furthermore, a conductive element 110 may consist of a single conductor piece or of two or more conductive pieces coupled together.

In at least one embodiment, a loop section 100 may be approximately 6.5 meters in length, comprise seven conductive elements 110 each having a diameter of approximately 3.8 cm. However, these values are only examples and are not meant to be limiting.

Conductive elements 110 of a section 100 may be mechanically interconnected or supported by one or more non-conductive frames 120. Conductive elements 110 may be arranged parallel to one another or they may be arranged to be substantially parallel to one another such that small angles between the elements contribute to the structural rigidity of each section 100. Frames 120 may be partly or wholly made of resistive (or "non-conductive") material for electrically isolating conductive elements 110 from one another.

In addition, frames 120 may maintain elements 110 in a spaced apart relationship. Elements 110 may be spaced apart by any suitable distance. In some embodiments, the ratio of the spacing between some or all conductive elements 110 to the diameter of conductive elements 110 exceeds 3 to 1. However, other spacing ratios may be used. Adequate spacing may reduce parasitic eddy current losses and lower the self or mutual inductance of current flowing in conductive elements 110 when compared to more closely positioned elements 110.

Frames 120 may comprise high-strength fibre-composite material, such as carbon fibre or fibreglass. In some embodiments, frames 120 may comprise two spaced apart frame members 121, 122, which may be mounted parallel to each other and orthogonally to conductive elements 110. In some embodiments, frame members 121, 122 may be in the form of foam-cored composite sheets. Frame members 121, 122 may be interconnected with one or more U-shaped composite channels 126 into which conductive elements 110 are fitted. In addition, frame members 121, 122 may be interconnected and further strengthened by one or more cross-members 125. Cross-members 125 may comprise composite material or any other suitable material.

Frames 120 may retain elements 110 securely apart and in-place. Such a structure may provide loop sections 100 with greater rigidity than may be attained from using unseparated conductive elements 110 in addition to the aforementioned electrical advantages of lowering the inductance of transmitter loop 80 or reducing parasitic eddy current losses. Furthermore, an arrangement of conductive elements 110 retained securely apart may have favourable implications for high quality bucking. Bucking attempts to annul a primary magnetic field, and thus may permit secondary magnetic fields to be measured with a higher sensitivity than would be possible without it. The combination of rigid loop sections 100, truss radials 300, 350 and a rigid hub 400, as a structure for their common attachment may in addition to holding the conductors in place, contribute to maintaining a constant magnetic field geometry in the region of a receiver sensor. This may further contribute to high quality annulment of the primary magnetic field.

The arrangement of conductive elements 110 within a loop section 100 may be disposed to utilize aerodynamic forces. In cross-section, as viewed from the ends of the conductive elements 110, conductive elements 110 may be arranged in an oval-like shape. Some conductive elements 110 may be disposed to lie in the wake of one or more adjacent conductive elements 110 to possibly reduce aerodynamic drag, increase lift, or to engage the air flow so as to minimize vibration or to increase the stability of the antenna system 10 as it is towed. In some embodiments, conductive elements 110 may be faired or may be decorated with fairings to possibly improve aerodynamic performance.

A loop section 100 may also comprise a section terminator 130 on one or both of its ends for connecting or coupling the section to another loop section or other structure. Section terminator 130 may be in the form of a shaft. Section terminator 130 may be securely coupled or integrally formed with a frame 120.

Section terminator 130 may be formed of or comprise a metal rod of low magnetic permeability. Terminator 130 may extend through a geometrical centre of one or both of frame members 121, 122. A first end of terminator 130 may terminate at inner frame member 121. Section terminator 130 may extend through outer frame member 122 and may be securely fastened to both frame members. Terminator 130 may connect to a mechanical linkage, such as a joint or tie rod, for connecting loop section 100 to an adjacent loop section 100.

In another embodiment (not shown), rather than being a separate component, a section terminator may be formed by extending a conductive element 110 past the ends of the other conductive elements 110.

Transmitter Circuit and Controller

Figure 11:
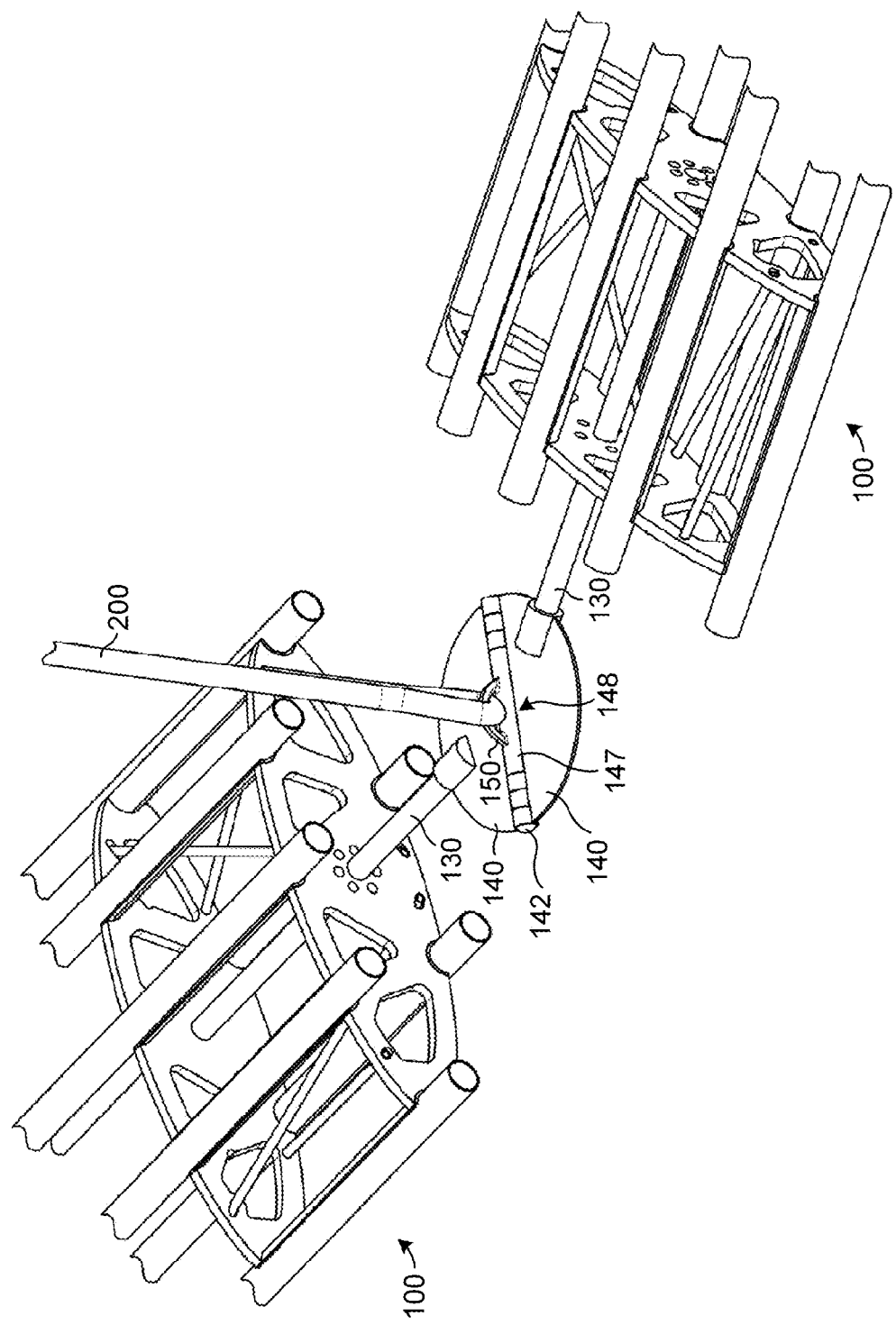
FIG. 11 is a perspective view of a joint connecting two adjacent loop sections in an embodiment.
Figure 11A:
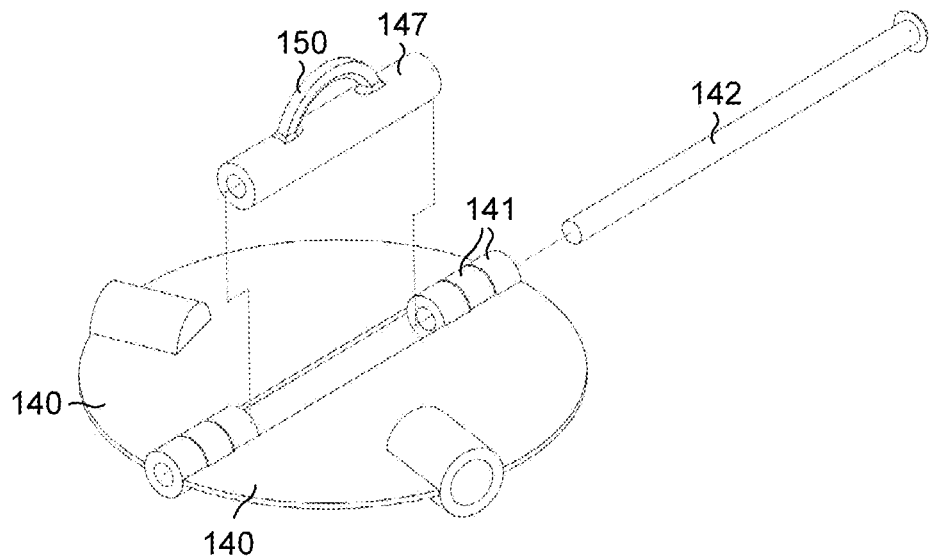
FIG. 11A is an exploded perspective view of a leaf hinge for connecting two adjacent loop sections in an embodiment.

Conductive elements 110 of adjacent loop sections 80 may be electrically coupled to one another to form part of a transmitter circuit. An electrical connection between conductive elements 110 may be a flexible jumper, with low resistance contacts between the jumper and the elements. In some embodiments, a jumper may comprise a flexible conductive cable suitably long and as flexible as required to permit adjoining loop sections 100 to articulate relative to one another. FIG. 11C shows electrical connections between the ends of two adjacent loop sections 100 in one embodiment. Conductive elements 110 of the two loop sections 100 are electrically coupled using flexible jumpers 190.

Electrical connectors 190 are not shown in the other Figures as they would obscure the view of other components, including the mechanical linkages between loop sections 100.

In aggregate, conductive elements 110 may be serially connected to form a loop shaped transmitter circuit about the circumference of transmitter loop 80. Transmitter circuit may have multiple turns about the circumference of loop 80 where each turn may traverse each loop section 100 through a different conductive element 110. The number of turns of transmitter circuit may be limited by the number of conductive elements 110 per loop section 100. In some embodiments, transmitter loop 80 may comprise two or more separate transmitter circuit loops.

A transmitter controller and driver may be electrically coupled to the two ends of a transmitter circuit loop to form an overall transmitter circuit. In one embodiment, at least one pair of conductive elements 110 of adjacent loop sections 100 may not be directly electrically connected together, permitting electrical current to be led into and out of the loop circuit through them from the transmitter driver. The transmitter controller may provide a time varying current to the transmitter loop circuit to generate a primary magnetic field.

A transmitter controller may be positioned at any suitable location in antenna system 10, including at or near the leading end of transmitter loop 80. In some embodiments, transmitter controller may be positioned on loop 80 or on forward radial 300. The transmitter controller may be powered through cabling from a power supply. A power supply may be positioned at any suitable location, including on tow cable 700 or at the aircraft.

In at least one embodiment, antenna system 10 may use currents of less than 400 A with a goal of achieving a transmitter moment in excess of 1,000,000 Am2. In some embodiments, the transmitter loop circuit may be energized by an "on-off-on reversed-off" periodic current waveform with a spectral coverage from the base frequency of approximately 3 Hz to at least 1 kHz. These values and numbers are only examples and are not meant to be limiting.

Bucking and Ancillary Systems

In some embodiments, antenna system 10 may comprise a bucking system (not shown) for generating a bucking magnetic field for annulling the primary magnetic field at one or more receiver sensors located inside the hub. One or more bucking coils forming a bucking loop may be rigidly attached to or otherwise positioned at hub 400. A bucking coil may be positioned in substantial alignment with the equatorial plane of the hub. In some embodiments, the transmitter loop circuit may be serially connected with one or more bucking coils.

An example bucking system and apparatus are described by West et al. in US 2014/0285206, "Bucking circuit for annulling a field", which is incorporated herein by reference. Electrical current in the bucking coils creates a magnetic field which may substantially oppose the primary magnetic field of the transmitter loop over a bucking volume in the hub. The bucking coils may be mounted on or near hub 400 more or less in the equatorial plane of hub 400. Electrical current feeding the bucking coils may run radially inward from the transmitter loop circuit on twisted or coaxial electrical cable, which may minimize the stray magnetic fields of the associated feeder current inside in the bucking volume. The resulting bucked field may reduce the unbucked primary field at locations in hub 400 by a factor of approximately 100 or more, depending on the arrangement of the bucking coils and the volume in hub 400 to be bucked.

In addition, a stabilization system may be used to stabilize a receiver sensor relative to motions of hub 400, including motions above a frequency of 1 Hz. In some embodiments, a stabilization system of the type disclosed by Polzer et al. in WO 2011/085462 A1, "Stabilization system for sensors on moving platforms", which is incorporated herein in its entirety, may be used. Magnetic fields may be measured by a magnetometer (e.g. a three component magnetometer) and receiver mounted on the stabilization system, operating within the bucked volume of the primary magnetic field. A magnetometer may be connected to one or both of a controller and a data recorder.

Furthermore, hub 400 may comprise a closed, weatherproof shell for protecting equipment located therein, such as a magnetometer or stabilization system.

Radials

Having reference to FIG. 2, one or more radials 300, 350 may connect hub 400 to transmitter loop 80. The embodiment shown in the Figures comprises forward radial 300 and rear radials 350, which are approximately equally spaced around hub 400 (e.g. at 120 degrees each). However, other embodiments may have a different number of radials or different radial spacing. A radial may join loop 80 at a mechanical linkage or joint, such as forward radial 300 connecting to leading joint 161 and rear radials 350 connecting to trailing joints 165 and 169. However, in other embodiments, a radial may join loop 80 at a loop section 100 instead of at a joint.

A radial may be a rope, cable, spar, truss or any other suitable structure for limiting the motion of loop sections 100 with respect to hub 400. In some embodiments, one or more radials may be rigid or substantially rigid. Forward radial 300 may be a truss comprising three spars, namely upper spar 302 and two lower spars 305. Each rear radial 350 may be a truss comprising two spars, namely upper spar 352 and lower spar 355. The structure of truss radials 300, 350 constrains points of loop 80 to lie in a common plane (e.g. in a transmitter loop plane) and at a fixed distance from hub 400 while loop 80 is airborne. In addition, radials 300, 350 may improve the stability of a primary magnetic field at the centre of loop 80 (e.g. at hub 400), which may improve the quality of bucking and measured secondary magnetic data. To suitably constrain the points of loop 80 to lie in a common plane, spars comprising a truss radial may be connected to points on the hub with substantial vertical offsets from the equatorial plane.

In another embodiment (not shown), one or more rear radials may be in the form of a truss having three or more spars.

FIG. 8 is a perspective view of system 10 at a leading joint 161 region of loop 80 where front radial 300 joins loop 80. Distal ends of the two lower spars 305 of forward radial 300 may conjoin to form a single lower joint spar 308, the end of which connects to hinged joint 161 via spar terminator 304 (or a different connection point in another embodiment). Two lower spars 305 and joint spar 308 may together form a "Y" shaped structure.

In at least one embodiment, as shown in the Figures, antenna system 10 may be capable of some deformation while it is lifted from or lowered onto the ground during liftoffs and landings. Flexible joints may connect some or all of loop sections 100 to allow for deformation of loop 80. In addition, one or more radials 300, 350 may be capable of pivoting about hub 400. In at least one embodiment, as shown most clearly in FIG. 1C, forward truss radial 300 may be capable of rotating or pivoting about hub 400 in an up/down direction relative to the equatorial plane of hub 400.

One or more spars 302, 305, 352, 355 may comprise a rigid tube or tube-like structure, which may provide substantial resistance to buckling under compressional loading without incurring a lot of weight. Buckling resistance may be enhanced with cross-bracing between the spars of a radial. Referring to FIG. 2, cross bracing 310 may interconnect forward spars 302, 305, 305. In addition, cross bracing 360 may interconnect rear upper and lower spars 352, 355 of rear radials 350. Cross bracing may be positioned at an approximate midway point between hub 400 and loop 80. A spar may be made partly or wholly of a composite material, including but not limited to carbon fibre or Kevlar™. Although not shown, in some embodiments, a spar may be reinforced with one or more stay cables running approximately parallel to its length. A stay cable may be separated from the spar by tensioning arms, and may resemble a diamond stay.

In one embodiment of AEM system 10, a single forward and a pair of rear radials 300, 350 interconnect hub 400 to loop 80. Upper spars 302, 352 and lower spars 305, 355 may connect transmitter loop 80 to hub 400 above and below, respectively, the equatorial plane of hub 400. This is best shown in FIG. 2. FIG. 4 shows a side view of antenna system 10. A rear truss radial 350 may lie in a plane orthogonal to the plane of loop 80. Truss radials 300, 350 may constrain points of loop 80 connected to the radials to lie in an equatorial plane of hub 400 while loop 80 is airborne. In addition, the radials may maintain a fixed distance between points of loop 80 connected to the radials 300, 350 and hub 400. The contribution of one or more radials to the stability or rigidity of electromagnetic transmitter antenna system 10 may contribute to the stability of a primary magnetic field in a bucking volume occupied by one or more sensors of the receiver.

Rear truss radials 350 may connect to hub 400 in a manner that allows them to swing a small amount in the equatorial plane of hub 400 and loop 80 while resisting tilting out of the equatorial plane. In other words, a rear truss radial 350 may be able to swing or pivot in a side to side, or azimuthal direction about hub 400 but may be prevented from pivoting in an up/down direction about hub 400. The amount of side to side movement may be restricted, for example, by connecting one truss to another truss using one or more spars, ropes or other connectors.

Figure 5:
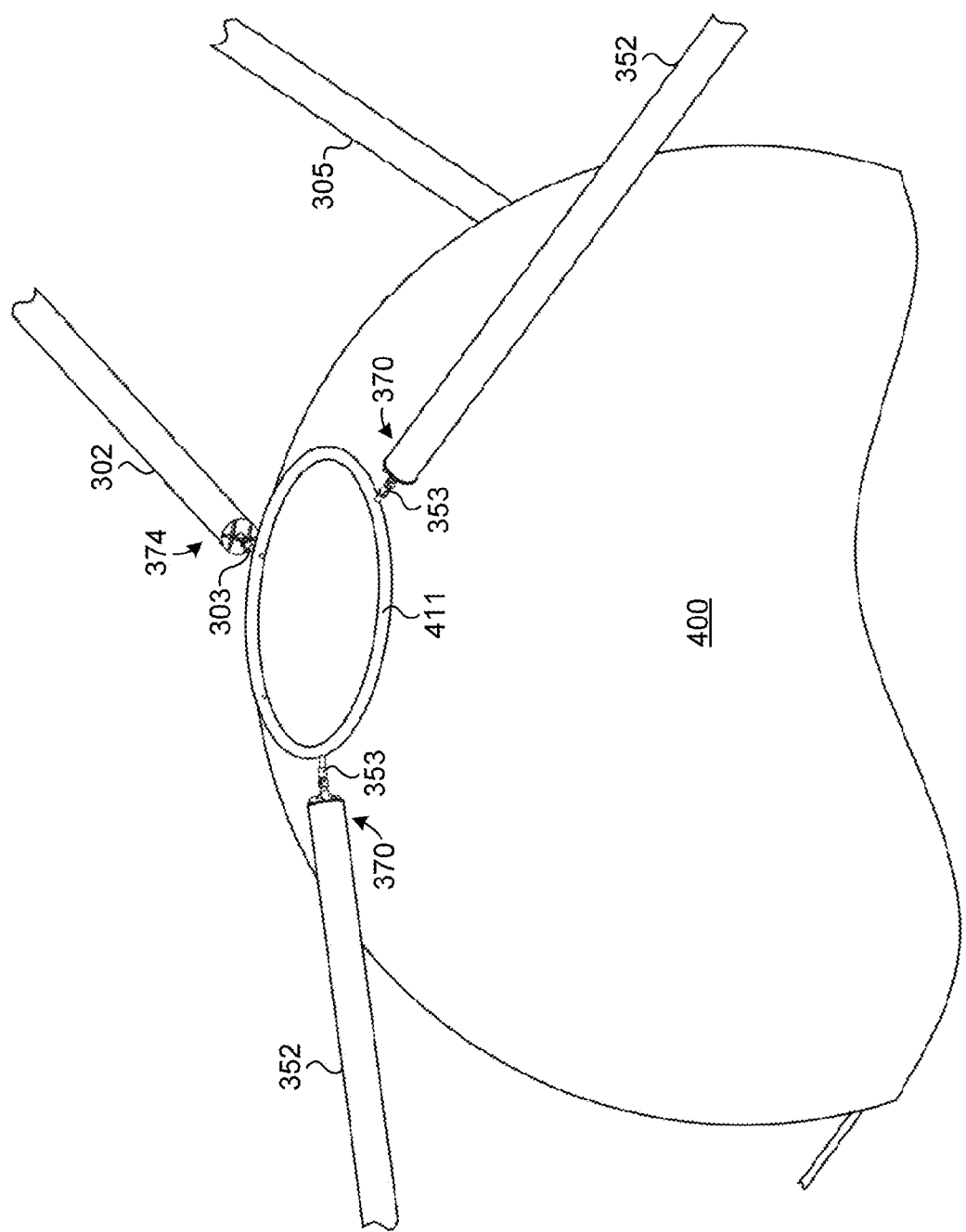
FIG. 5 is a top perspective view of a hub in an embodiment.
Figure 6:
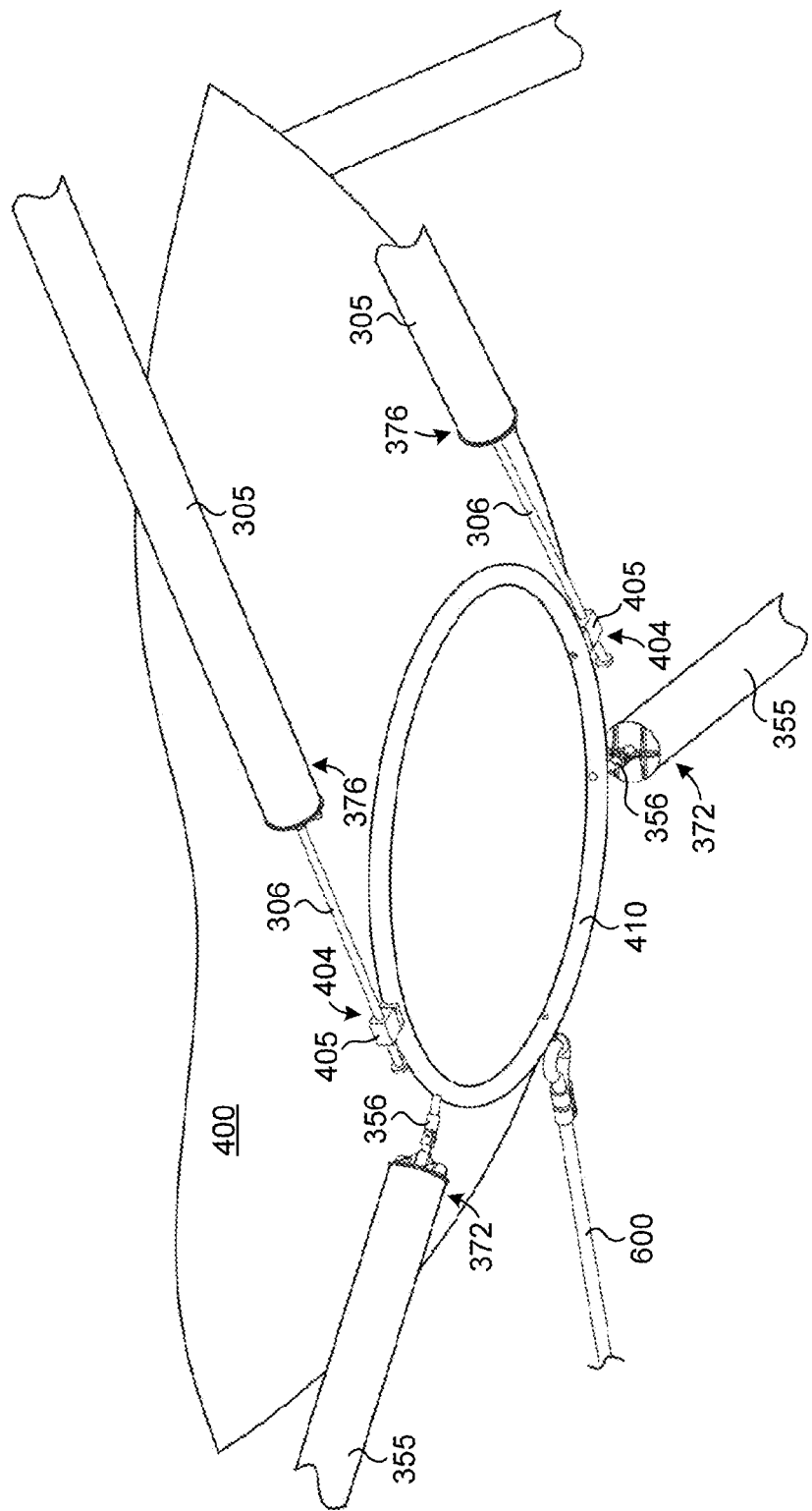
FIG. 6 is a bottom perspective view of a hub in an embodiment where a forward radial has been rotated upwardly about the hub.
Figure 7:
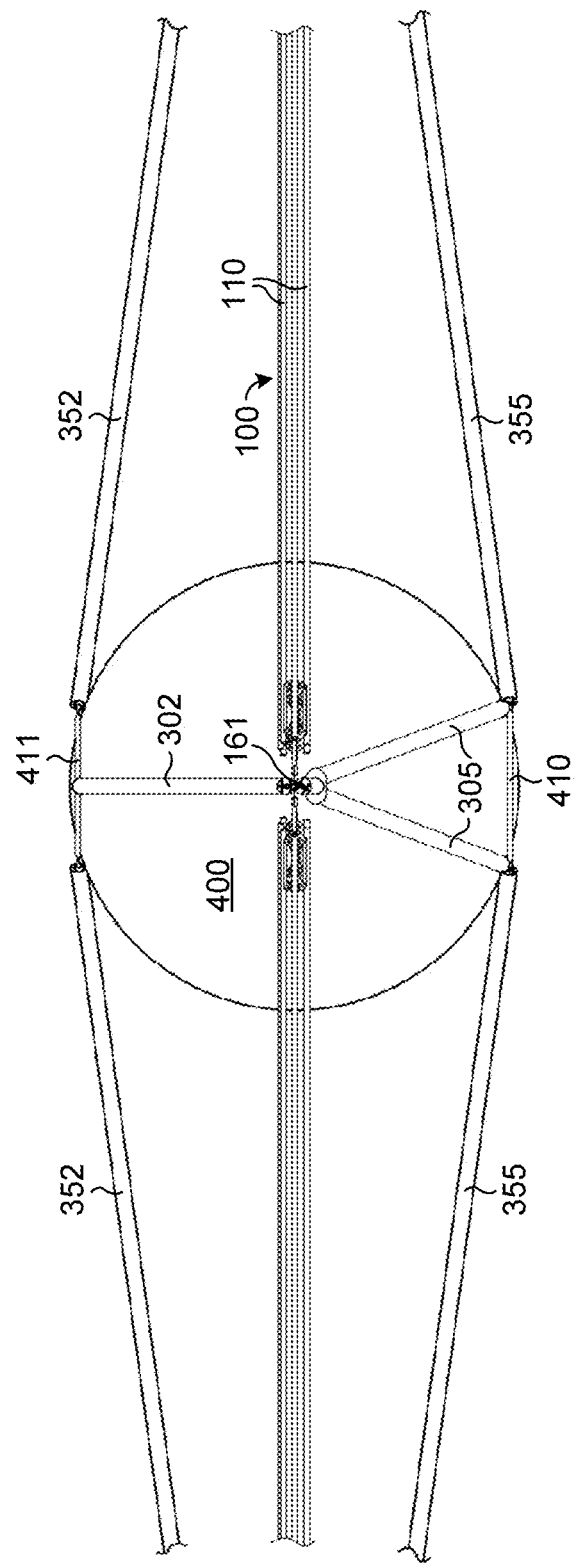
FIG. 7 is a front view of the antenna system in an in-flight position in an embodiment.

One embodiment of the means for connecting radials 300, 350 to hub 400 is shown in FIG. 5 and FIG. 6. FIG. 6 is a bottom perspective view of hub 400 where forward radial 300 has been rotated upwardly about the hub, causing the proximal ends of its lower spars 305 to be drawn away from the hub. A front view of antenna system 10 in an embodiment showing the connections is provided in FIG. 7 where the forward truss radial 300 (comprised of upper spar 302 and lower spars 305) is in an in-flight position, meaning it has not been rotated upwardly.

Hub 400 may comprise one or more of lower connection ring 410 and upper connection ring 411, which may be securely positioned near the bottom and top of hub 400, respectively, for providing one or more connection points for connecting one or more radials 300, 350 to hub 400. Connection rings 410, 411 may be oriented to be approximately parallel to the equatorial plane 401 of hub 400 and may comprise attachment means for connecting one or more radials 300, 350 to hub 400. Connection points may be provided at one or more of above, below and at equatorial plane 401 of hub 400.

Referring to FIG. 5, proximal end 370 of upper spar 352 of each rear truss 350 may pivotally connect to hub 400 at upper connection ring 411. Proximal end 370 may comprise a terminator 353 for connecting to upper connection ring 411.

Referring to FIG. 6, lower spars 355 of each rear truss 350 may connect to lower connection ring 410 in a similar manner as upper spars 352. Proximal end 372 of lower spar 355 of each rear truss 350 may pivotally connect to hub 400 at lower connection ring 410. Proximal end 372 may comprise a terminator 356 for connecting to lower connection ring 410.

The connection of forward radial 300 to hub 400 is now described. Referring to FIG. 5, forward radial 300 may be allowed to pivot relative to the hub in an up/down direction out of an equatorial plane of hub 400. Again, a pivoting forward truss may accommodate concave upward warping or bending of loop 80 during liftoff and landing by rotating upwards about the hub. A proximal end 374 of upper spar 302 of forward truss radial 300 may pivotally connect to hub 400 at upper connection ring 411 to allow loop section joint 161 (see FIG. 2) to rotate upwards and out of (e.g. above) equatorial plane of hub 400 when loop 80 is lifted from and landed to the ground. Proximal end 374 may comprise a terminator 303 for connecting to upper connection ring 411.

Referring to FIG. 6, lower spars 305 of forward truss radial 300 may connect to lower connection ring 410 in a way that permits them to lengthen and so allow forward truss radial 300 to pivot or rotate at hub 400 in up and down direction. In at least one embodiment, the connection of lower spars 305 to hub 400 may comprise a variable connection, including but not limited to a sliding or extendable/retractable connection, for accommodating a change in length of lower spars 305 (or a change in the distance between a distal end of forward radial 300 and hub 400) as forward truss radial 300 rotates upwards. Proximal ends 376 of lower spars 305 may each comprise a terminator 306 for coupling to lower connection ring 410 by way of joints 404. Joints 404 may comprise a sleeve 405 that may in turn be rotatably coupled to lower connection ring 410. In this way, terminators 306 and joints 404 may slidingly connect lower spars 305 to hub 400. Each terminator 306 may slidingly extend through sleeve 405 to allow lower spars 305 to move away from and towards hub 400 when forward truss radial 300 rotates up and down. Sleeves 405 may rotate relative to lower connection ring 410 as forward truss radial 300 rotates up and down.

In at least some embodiments, lower spars 305 of forward truss radial 300 will likely be in compression while in-flight. This may cause spar terminators 306 to be securely butted against sleeves 405, thereby contributing to the rigidity of loop 80.

One or more of the connections of rear spars 352, 355 to connection rings 410, 411 may use a loose tongue and clevis connection. However, in other embodiments, a radial may be joined to hub 400 in any other suitable way, including by a universal joint, or by one or more ball joint connections. In addition, one or more of spar terminators, including terminators 353, 356, may be made of or comprise low magnetic permeability material, such as stainless steel, or other metal or alloy.

In some embodiments, one or more biasing mechanisms may be used to provide forces tending to restore the loop to its normal in-flight configuration. In some embodiments, an in-flight configuration has all loop sections lying within the common plane of the equatorial plane of hub 400. Additional in-flight stability of antenna system 10 may be achieved by utilizing one or more biasing mechanisms in combination with a pivoting front radial 300. A biasing mechanism may act to bias front radial 300 towards an in-flight configuration. In some embodiments, an in-flight configuration has front radial 300 lying in or approximately parallel to an equatorial plane of hub 400 or the transmitter loop plane. In some embodiments, an in-flight configuration may have front radial 300 lying out of the equatorial plane, for example within +/−10 degrees of the equatorial plane of hub 400. Examples of this positioning are shown clearly in FIG. 1A and FIG. 4.

Figure 6A:
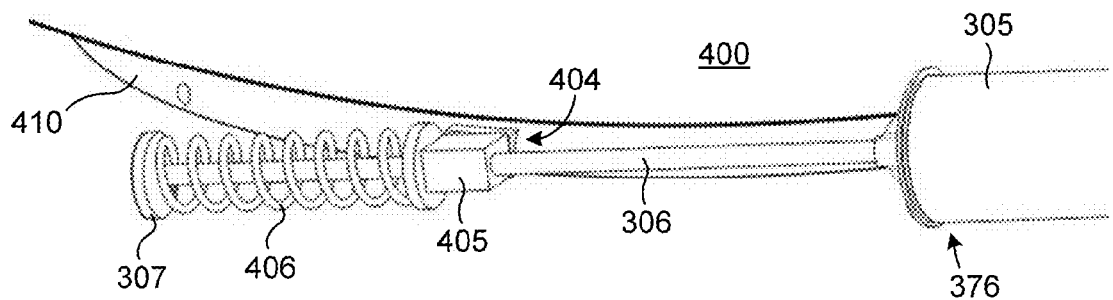
FIG. 6A is a perspective view of a lower portion of the hub in an embodiment comprising a mechanism for biasing the orientation of the front radial towards an in-flight position.

The biasing mechanism may be capable of exerting a bias or restoring force that is sufficient to improve the in-flight stability of loop 80 but also permits the pivoting action of front radial 300 during liftoff or landing. The biasing mechanism may comprise a passive spring mechanism for biasing front radial 300 towards an in-flight configuration. For example, FIG. 6A shows spring 406 disposed between a proximate end 307 of spar terminator 306 and sleeve 405. As front radial 300 rotates upwardly relative to hub 400, proximate end 307 of spar terminator 306 moves towards sleeve 405, thereby compressing or further compressing spring 406. Spring 406 may therefore act to bias front radial 300 towards an in-flight configuration in which radial 300 lies more or less in the equatorial plane of hub 400. FIG. 6A is only an example of a biasing mechanism. Other mechanisms may be used.

Figure 6B:
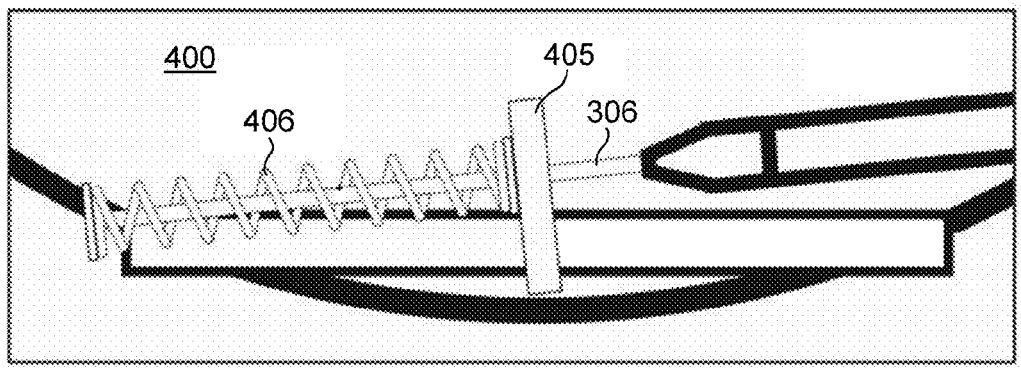
FIG. 6B is a perspective view of a lower portion of the hub in another embodiment with the front radial in an in-flight position.
Figure 6C:
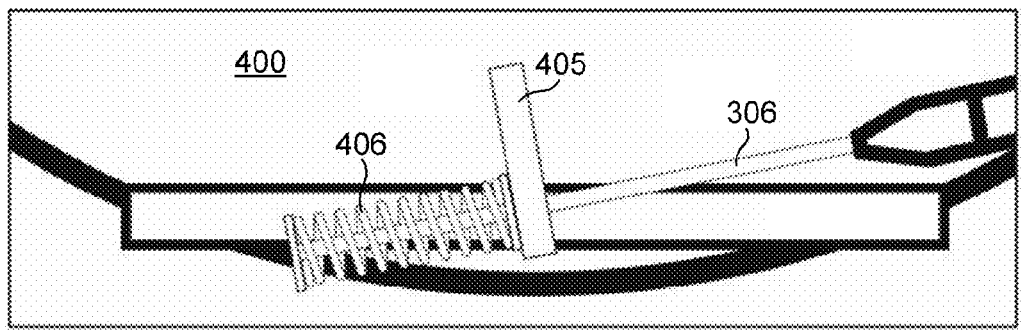
FIG. 6C is a perspective view of a lower portion of the hub in the embodiment of FIG. 6B with the front radial in an upwardly rotated position.

FIGS. 6B and 6C show another embodiment in which block or sleeve 405 defines a slot for receiving spar terminator 306 to allow spar terminator 306 to slide within the slot as front radial 300 rotates upwardly or downwardly relative to hub 400. For example, FIG. 6B shows spar terminator 306 and spring 406 when front radial 300 is in an in-flight configuration (e.g. within the equatorial plane of hub 400). FIG. 6C shows the same components when front radial 300 has been rotated upwardly relative to hub 400, thereby compressing spring 406. In this embodiment, spar terminator 306 is shown at a lower position relative to block 405 in FIG. 6C compared to in FIG. 6B.

In some embodiments, the biasing mechanism may comprise an active mechanism including but not limited to one or more air springs. An active biasing mechanism may be selectively controlled to exert a stronger biasing force during flight for possibly increasing the rigidity of transmitter loop 80 in flight. The active biasing mechanism may be controlled to exert a weaker biasing force during liftoff or landing to allow front radial 300 to pivot relative to hub 400 during a liftoff or landing. An air spring may be powered by a compressed air supply (not shown) of the antenna system 10. A compressed air supply may be used to power one or more actuator or other devices in an antenna system. Therefore in some embodiments, an active biasing mechanism may provide for a variable biasing force to vary the state of rigidity in antenna system 10 for accommodating flexibility for liftoffs and landings, and rigidity during flight.

Although a present embodiment has been described as utilizing a biasing mechanism in combination with front radial 300, some embodiments may comprise one or more biasing mechanisms for use with one or more other radials of antenna system 10.

Connections of radials 300, 350 to transmitter loop 80 in some embodiments are now described. In some embodiments, forward radial 300 may connect to a joint on loop 80. Referring to FIG. 8, distal end 382 of upper spar 302 of forward truss radial 300 may comprise a spar terminator 301. Similarly, distal end 384 of lower joint spar 308 of forward truss radial 300 may comprise a spar terminator 304. Spar terminators 301, 304 may join transmitter loop 80 at a joint interconnecting adjacent loop sections 100, such as leading joint 161.

Figure 12:
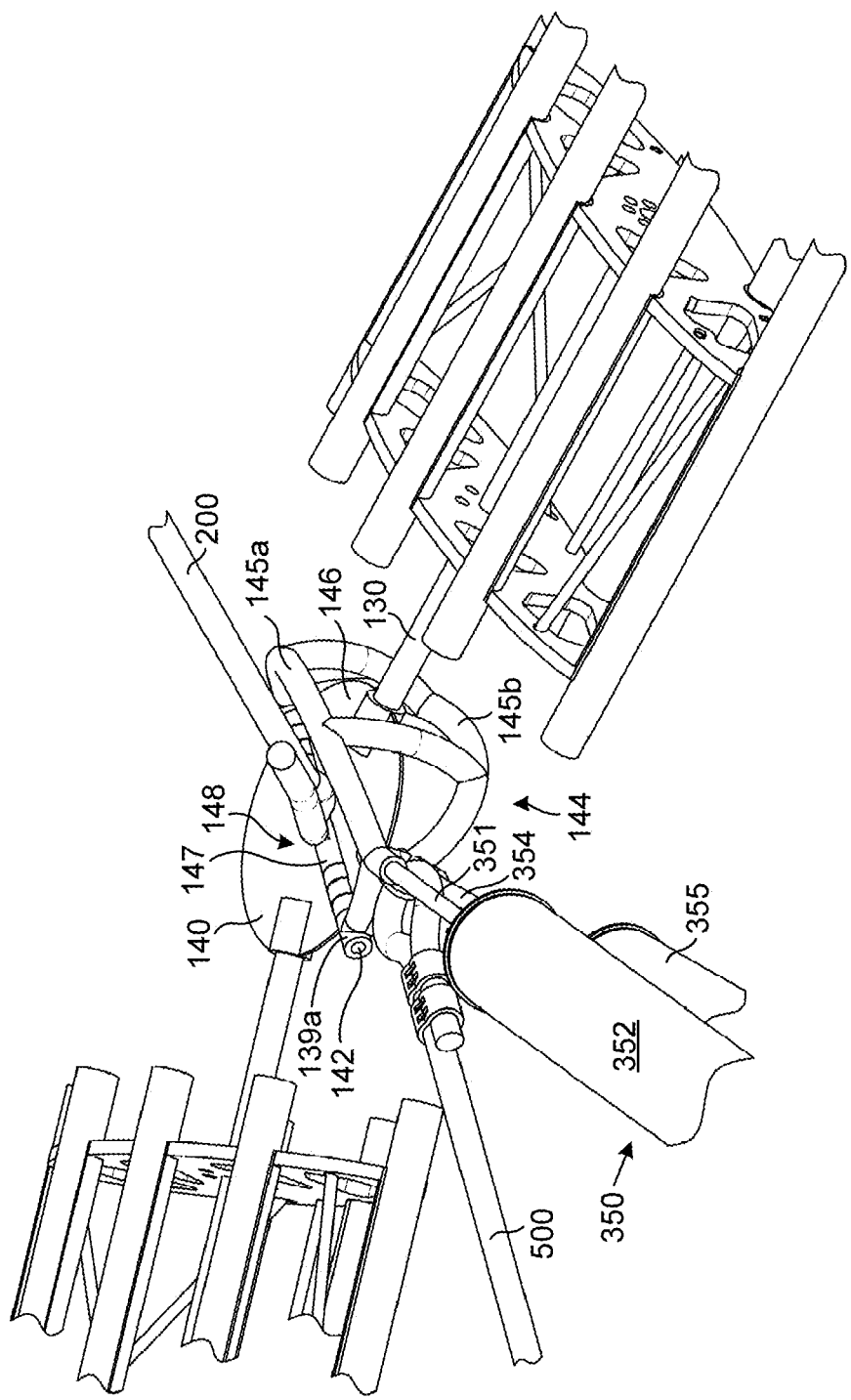
FIG. 12 is an elevated perspective view of a joint connecting two adjacent loop sections and a radial in an embodiment.

One or both of rear radials 350 may also connect to a joint on loop 80. As shown in FIGS. 2 and 9, in some embodiments, rear radials 350 may connect to joints 165, 169. Referring to FIGS. 9 and 12, a rear radial 350 may connect to a joint in any suitable way, including by way of a yoke 144, which is described further below. Outer distal end 378 of upper spar 352 and outer distal end 380 of lower spar 355 may comprise outer spar terminators 351 and 354, respectively, for connecting to a joint. The distal ends of the spars of one or more radials 300, 350 may be conjoined for connection to transmitter loop 80.

Cable Radials, Chords

Figure 3:
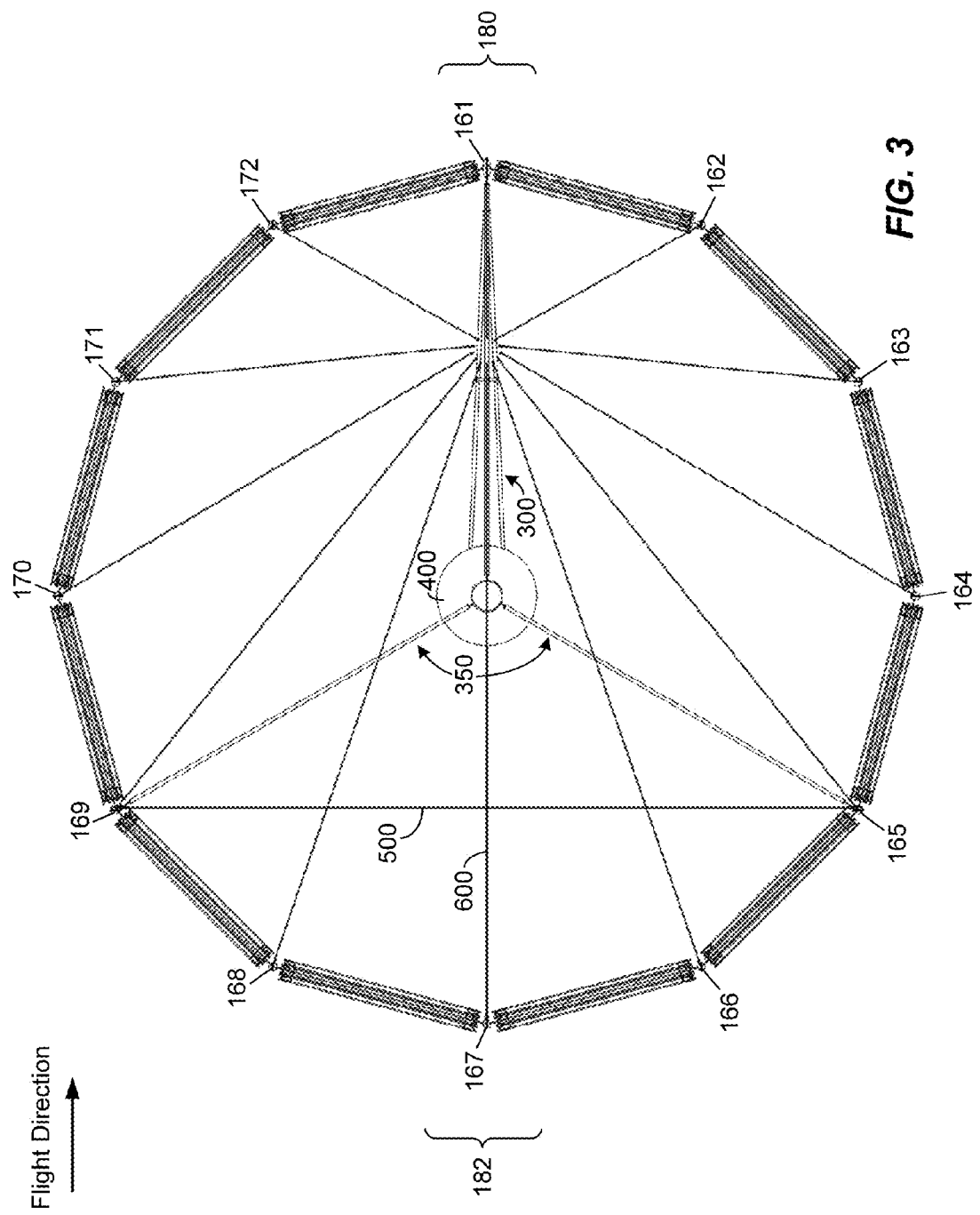
FIG. 3 is a top view of the antenna system of FIG. 2.

In addition to rigid radials 300, 350, the structure of antenna system 10 may be reinforced by one or more other supporting structural members. In some embodiments, one or more chords may connect two points of transmitter loop 80. In some embodiments, as shown in FIG. 2 and FIG. 3, chord 500 may connect joints 165, 169 to restrain the rear radials 350 from spreading laterally, including as trailing portion 182 of transmitter loop 80 contacts the ground during liftoff and landing. A chord may be made of any suitable material, including rope.

In addition, antenna system 10 may comprise one or more radials connecting hub 400 to transmitter loop 80. Referring to FIG. 2, radial 600, which may be a rope, cable or any other suitable material, may connect hub 400 to trailing joint 167 of loop 80. FIG. 6 shows a connection of radial 600 to hub 400 at lower connection ring 410. In other embodiments, however, one or more other radials may connect to hub 400 or to loop 80 at any other suitable locations.

Joints

Loop sections 100 may be interconnected in any suitable way, including with mechanical linkages in an end to end manner. One or more of the mechanical linkages may comprise a flexible joint allowing for rotation between two adjacent sections. This may allow loop 80 to change shape, for example, to accommodate bending stresses during liftoff and landing. In some embodiments, one or more mechanical linkages may comprise a rigid "tie" joint for constraining the separation between it and other tie points.

Figure 10:
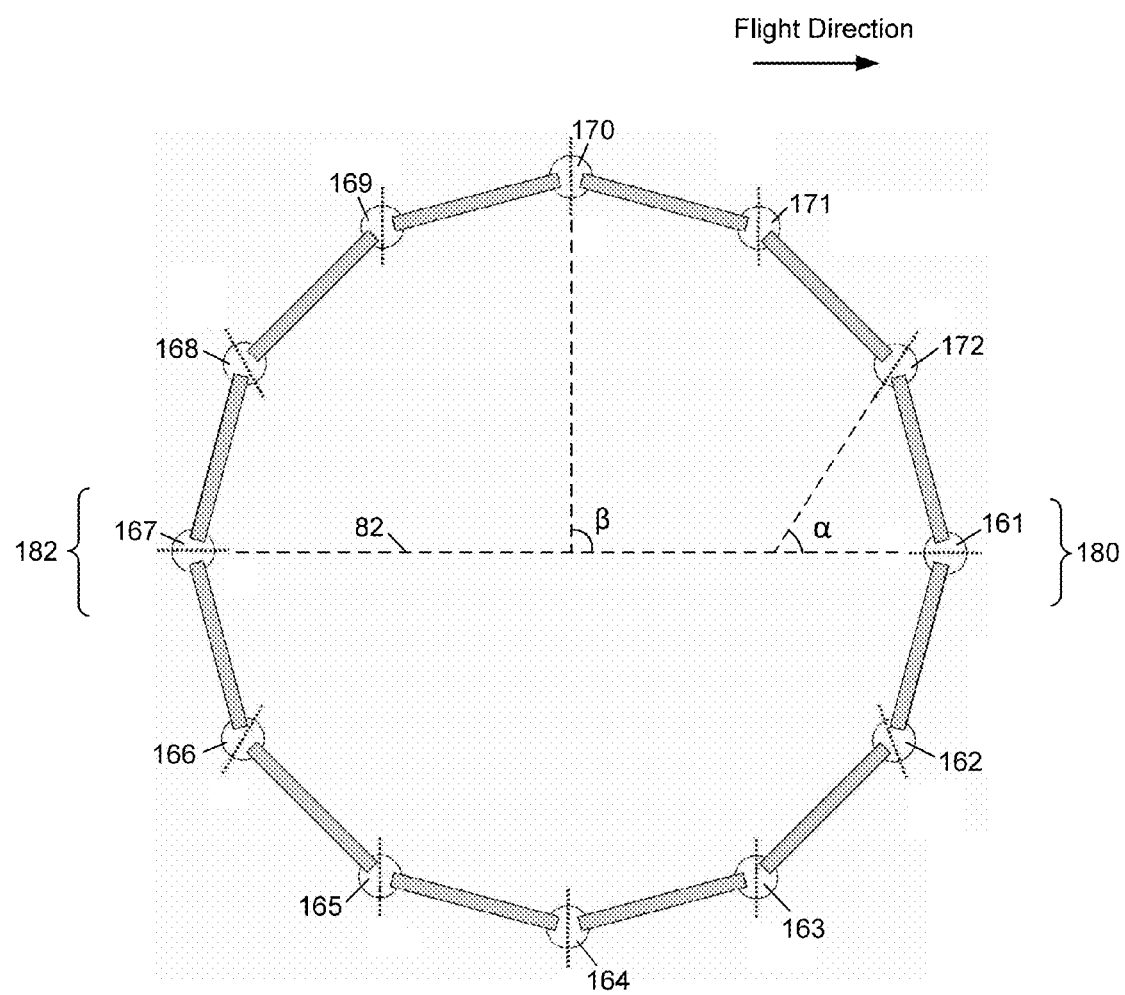
FIG. 10 is a top representational view of a transmitter loop, shown in isolation, in an embodiment.

FIG. 10 is a top representational view of a transmitter loop in the embodiment shown in the Figures comprising loop sections 100 and interconnecting flexible hinge joints 161 to 172. In some embodiments, only some of the joints may be flexible joints or hinge joints. Hinge joints where the axis of rotation of a hinge is disposed to be substantially in the plane of the loop may limit the ways transmitter loop 80 is able to flex compared to a loop having flexible joints with greater than one degree of freedom. Using flexible joints that limit the degrees of freedom of movement between adjacent loop sections 100 may contribute to the stability and rigidity of loop 80. In some embodiments, one or more flexible joints other than hinge joints that provide only one rotational degree of freedom may be used.

Hinge joints 161 to 172 may be arranged relative to loop 80 so that their axes of rotation are oriented in one or more specific directions within the plane of the loop. Flexible joints between some or all loop sections 100 allow loop 80 to change shape during liftoff and landing. In some embodiments, the use of flexible joints having only one degree of freedom and orienting the axes of rotation of at least some of the joints in specific ways may increase enhance the rigidity or stability of loop 80 and antenna system 10 during flight. The rotational axes of hinge joints 161 to 172 in one embodiment are indicated with dotted lines at each joint in FIG. 10 and when the loop is flat, the rotational axes lie substantially in the plane of the loop.

An intended direction of flight of antenna system 10 may be approximately parallel to an axis that intersects leading and trailing end regions of loop 80, which in this embodiment is where hinge joints 161, 167 are located. This axis may be referred to as a longitudinal axis 82 of transmitter loop 80. Leading hinge joint 161 and trailing hinge joint 167 may have their rotational axes approximately parallel to longitudinal axis 82, meaning with angles of approximately 0 degrees relative to longitudinal axis 82. Hinge joints 163, 164, 165, 169, 170, 171 may have their rotational axes oriented at approximately 90 degrees relative to longitudinal axis 82 (indicated as angle $\beta$). The angle of orientation of hinge joints 162, 166, 168, 172 may lie between the angle values of joints 161, 167 and the angle values of joints 163, 164, 165, 169, 170, 171, for example at approximately 60 degrees to longitudinal axis 82 (indicated as angle $\alpha$).

As can be seen in FIG. 10, flexible joints 162 to 166 and 168 to 172 are located away from leading end region 180 and trailing end region 182 on the circumference of transmitter loop 80. In other words, these joints are located on the circumference of loop 80 at positions other than at leading end region 180 and trailing end region 182 of loop 80. These two regions on either side of loop 80 between leading and trailing ends of loop 80 may be referred to as lateral regions of the loop.

However, in other embodiments (not shown), the rotational axes of one or more of the hinge joints of transmitter loop 80 may differ from the angles indicated in FIG. 10. One or more angles may differ by any suitable value, including values within the range of 0 to 20 degrees or more, from the values shown in FIG. 10 and described above.

Joint Biasing Mechanisms

In some embodiments, a biasing mechanism may be part of or used in combination with one or more joints 161 to 172 to bias the joint towards an in-flight configuration. By biasing a joint, and thus two adjacent loop sections 100, towards an in-flight configuration, a biasing mechanism may contribute to the rigidity or stability of loop 80 during flight. A biasing mechanism may include any suitable type of biasing device, including but not limited to one or more leaf springs or air springs. In some embodiments, different biasing mechanisms with different biasing forces may be used to apply to one or both of the positive and negative rotations of a joint to bias adjacent loop sections 100 towards a concave upward position. A biasing force may be controllable such as by means of air springs and set to provide stability during flight while being sufficiently compliant during takeoff and landing to allow loop 80 to change shape.

Figure 11B:
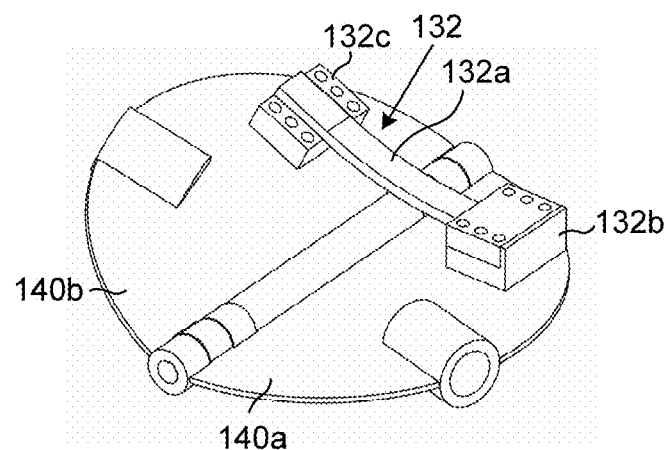
FIG. 11B is a perspective view of a hinge and a biasing mechanism in an embodiment.
Figure 11C:
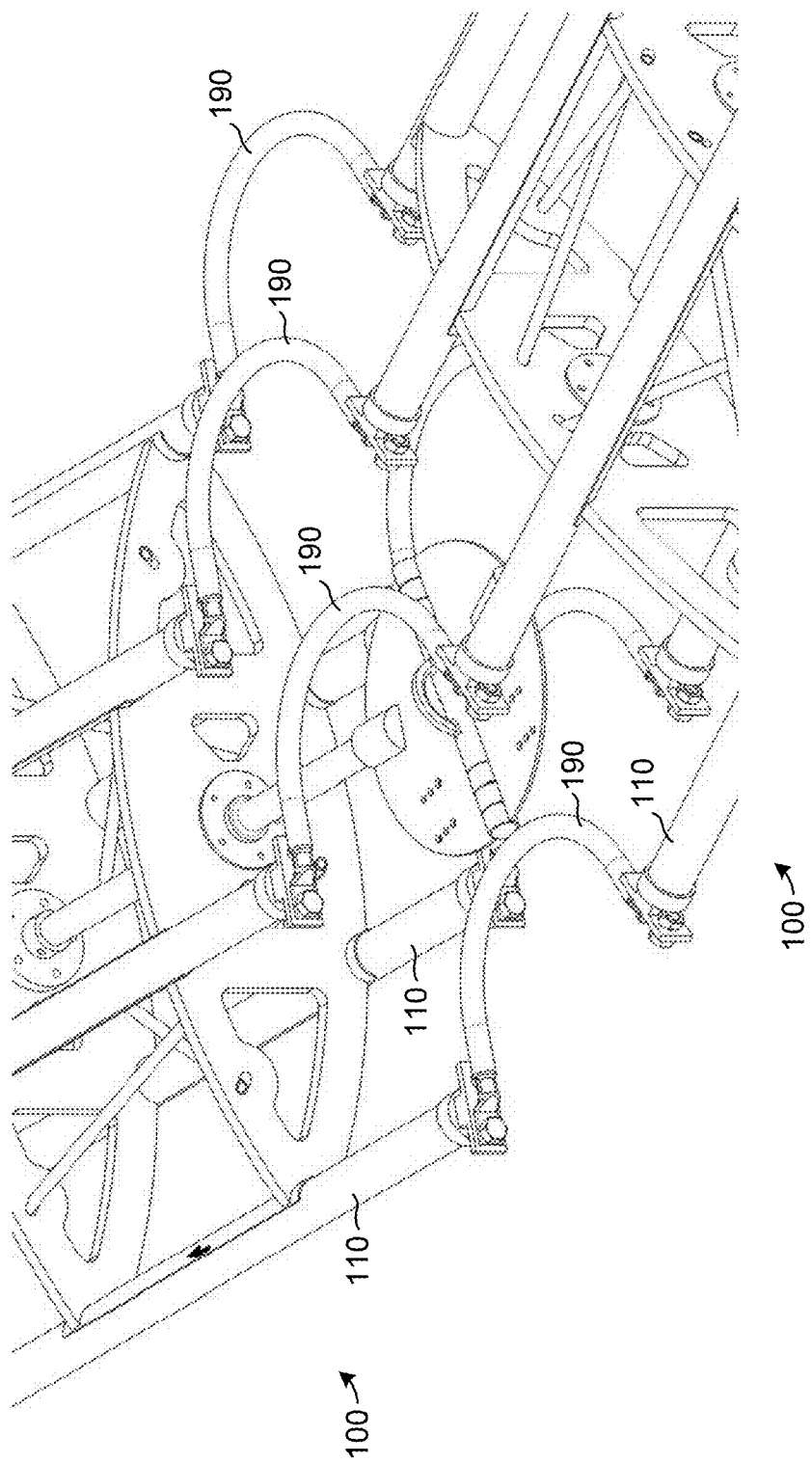
FIG. 11C is a perspective view of a flexible mechanical joint and the flexible electrical connectors interconnecting two adjacent loop sections in an embodiment.

Referring to FIG. 11B, a biasing mechanism 132 may extend between opposing hinge leaves 140a, 140b of a flexible joint. As shown, in some embodiments, biasing mechanism 132 may include a leaf spring. Leaf spring 132 comprises a resilient beam 132a connected to a first hinge leaf 140a by way of a mount 132b. Beam 132a extends across the hinge axis to lie on block 132c attached to the second hinge leaf 140b. This arrangement provides a restoring torque to relative rotation of the hinge leaves to reduce the relative angle of the hinge leaves to less than 180 degrees on the side of the hinge on which the block 132c is mounted. A similar biasing mechanism can be positioned at the opposite side of hinge leaves 140a, 140b to resist rotations in the opposite direction. Biasing mechanism 132 may bias hinge leaves 140*a*, 140*b*, and thus adjacent loop sections 100, towards planar alignment with one another for a planar in-flight configuration of loop 80.

The structure of the flexible joints of loop 80 may differ based on where they are positioned in loop 80. One or more differences in the joints may be due to the joint connecting to one or more of a radial 300, 350, a chord 500, a rope radial 600, or other antenna system component.

FIG. 11 is a perspective view of a joint connecting two adjacent loop sections 100 where the joint does not connect to a radial 300, 350. This style of joint may be used at one or more of flexible joints 162-164, 166, 168, 170-172 as may be seen in FIGS. 2 and 10, although the angles at which loop sections 100 connect to the joints may differ depending on the location of the joint.

Referring to FIG. 11, a hinge joint may be in the form of a leaf hinge having two hinge leaves 140 rotationally connected with a hinge pin 142. In other embodiments, a hinge joint may be any other suitable type of hinge having two hinge members connected with a hinge pin in place of the hinge leaves. One or more hinge joints of loop 80 may be oriented so hinge leaves 140 lie more or less in the plane of loop 80 when the loop is in flight. A hinge leaf 140 may be capable of joining to a loop section 100, in some embodiments by way of loop section terminator 130. In some embodiments, terminator 130 may connect to leaf 140 using one or more bolts, welds, or any other suitable method.

Referring to FIG. 11A, hinge pin 142 may define a rotational axis of the hinge, or hinge axis. Each hinge leaf 140 may have one or more interface openings, or knuckles 141, for receiving pin 142. A free bushing 147 may be disposed between knuckles and may ride on pin 142 independently of hinge leaves 140. A hinge leaf 140 may comprise a relatively flat plate. As previously described in relation to FIG. 11B, a joint may comprise a biasing mechanism for biasing the angle a hinge may assume.

Lift ring 150, to which a lift rope 200 may be attached, may be coupled to a hinge joint. Ring 150 may be coupled to bushing 147. Bushing 147, which may be independent of both leaves 140, may be located at a point of projection of loop section terminators 130 with hinge pin 142, and may permit lift rope 200 to rotate freely about the hinge axis so a force of lift rope 200 may be directed through the centre of hinge pin 142. This may allow forces from the loop section terminators 130 and lift rope 200 to project through a single centre point 148 at hinge pin 142 where bushing 147 to lift ring 150 is located. Such an arrangement may reduce off-axis torques on hinge pin 142 that may result in binding.

Figure 13:
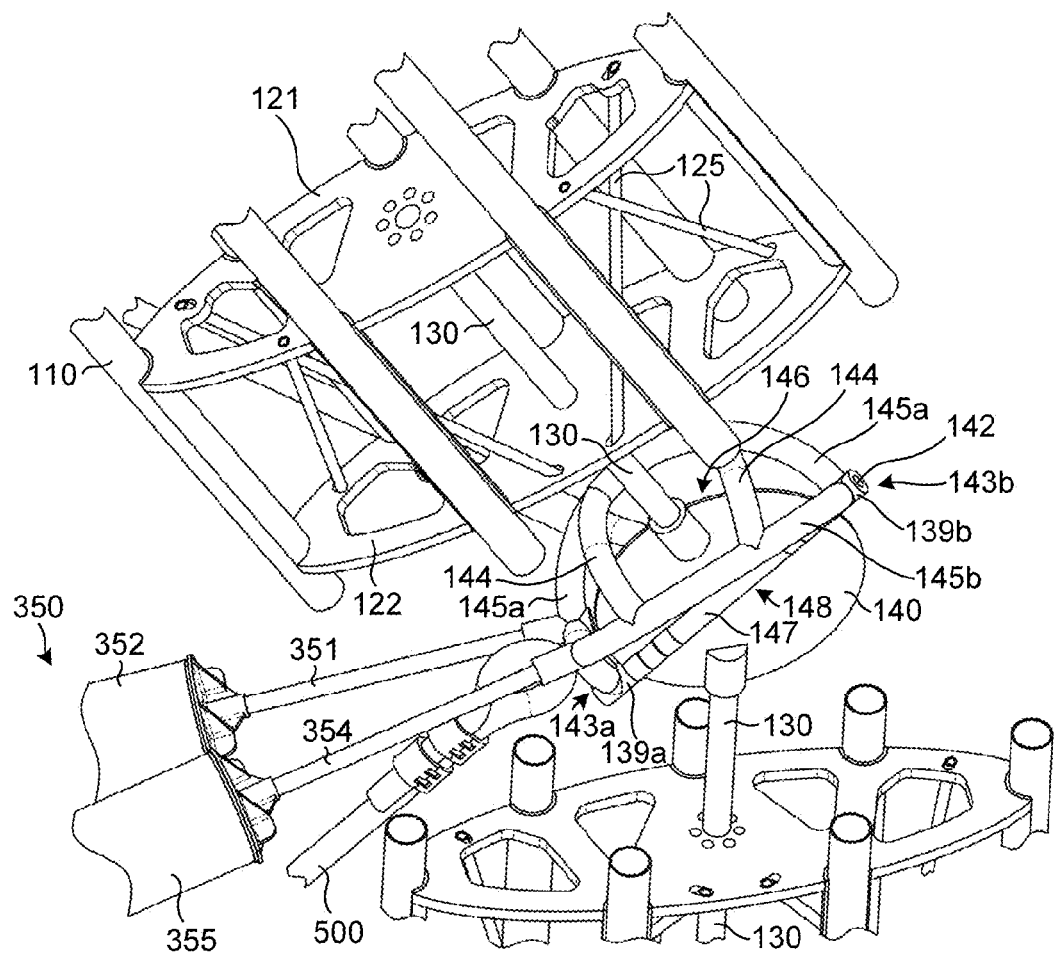
FIG. 13 is an upwardly perspective view of the joint shown in FIG. 12.

FIGS. 9, 12 and 13 show a joint connecting two adjacent loop sections 100 where the joint connects to a rear radial 350. This style of joint may be used at one or more of flexible joints 165, 169 as may be seen in FIGS. 2 and 10.

Referring to FIG. 12, a hinge joint may connect to a radial, such as rear radial 350. A hinge joint may comprise a yoke 144, which may engage hinge pin 142 on both of its ends. Yoke 144 may provide a balanced loading on the respective hinge pin 142 due to forces applied by a rear radial 350. Yoke 144 may cause those forces to act as if they were applied through a centre point 148 of hinge pin 142.

Yoke 144 may be rigidly connected to a rear radial 350. Yoke 144 may connect to opposite ends of hinge pin 142 using bushing 147 or bushings 139*a* and 139*b*. Bushings placed between yoke 144 and hinge pin 142 may permit the yoke to rotate freely about the hinge pin axis. Yoke 144 may reduce a bending moment that would otherwise occur if rear truss radial 350 was connected to either the hinge leaves 140 or pin 142.

Referring to FIGS. 12 and 13, yoke 144 may be C-shaped as viewed from below, and may split as a "Y" from the inside end 143*a* of hinge pin 142, with the base the "Y" riding on bushing 139*a* positioned on inside end 143*a* of hinge pin 142. On the outside end 143*b* of hinge pin 142, yoke 144 may split as a "V" with the base of the "V" being attached to a second bushing 139*b* riding on an outer end 143*b* of hinge pin 142. The prongs of the "Y" may connect to the prongs of the "V", so yoke 144 may contain an inner open region 146 for allowing a connection of loop section terminator 130 to hinge leaf 140. Yoke 144 may thus comprise an upper part 145*a* and a lower part 145*b*, formed by the joining of the prongs of the "Y" and "V", to which the upper spar 352 and lower spar 355 of rear radial 350 are respectively coupled. The prongs of the "Y" and of the "V" which together form the upper and lower parts of the yoke may further be reinforced by cross members, so that the inner open region 146 is approximately rectangular in outline: one cross member may connect the upper and lower prongs of the "Y" and a second cross member may connect the upper and lower prongs of the "V". The outer distal ends of upper spar 352 and lower spar 355 may comprise outer spar terminators 351 and 354, respectively, for connecting to yoke 144 in any suitable way, including using one or more bolts. In addition, yoke 144 may comprise structure, such as a loop, ring, bracket, etc. for connecting to one or more chords 500 as shown in FIGS. 9 and 12.

Again referring to FIG. 13, inner open region 146 of yoke 144 may permit the hinge to rotate while leaving terminator 130 of a loop section 100 free of yoke 144 as loop sections 100 rotate about the hinge joint. Yoke 144, loop section terminators 130 and lift ring 150 may be arranged so the forces exerted on the hinge joint act through a centre point 148 (see FIGS. 9 and 12) of the hinge joint so that torque on the hinge lies substantially parallel to the hinge pin axis.

FIG. 8 shows a joint that may be used at leading joint 161 as may be seen in FIGS. 2 and 10. Trailing joint 167 may use a similar style of joint but in at least some embodiments, as shown, trailing joint 167 does not connect to a radial 300, 350.

As shown in FIG. 8, leading joint 161 may connect to forward radial 300. In some embodiments, as shown, spar terminators 301 and 304 of forward radial 300 may connect to the hinge joint in any suitable way, including through a connection to hinge pin 142 at a centre point 148 using a same bushing 147 used to connect to lift ring 150. A hinge axis defined by hinge pin 142 may lie in a vertical plane defined by spar terminators 301 and 304. As in the case of all other joints, impinging forces are directed through the centre point 148 located on the hinge axis at an intersection of a projection of the lift rope 200 and projections of loop section terminators 130 and the projection of the spar terminators 301 and 304.

In other embodiments of the present disclosure, one or more of different hinge arrangements, different hinge types, different hinge axes orientations, and different hinge biasing mechanisms may be employed to permit loop 80 to change shape on liftoff and landing as well as to provide contribute to the rigidity and stability of antenna system 10 during flight.

General

The orientation or attitude in flight of antenna system 10 may be adjusted by altering its gravitational balance, for example by positioning a transmitter controller in leading portion 180 of system 10. In some embodiments, the attitude of antenna system 10 may be aerodynamically oriented or stabilized by fins or drag elements. One or more aerodynamically stabilizers may be positioned in trailing portion 182 of system 10 or in any other suitable location. Aerodynamic forces may apply biasing forces to stabilize the shape of the loop. For example, in some embodiments, fins, drag elements, or other structures may be used to apply aerodynamic forces to further stabilize the shape of the loop.

The structures and shapes of the loops described in the above embodiments are not meant to be limiting. Loops may comprise circular, elliptical, oval, helical or other shapes. In addition, loops may comprise relatively straight sections which together form a substantially closed shape. Examples include rectangles, hexagons, octagons, and dodecagons. Loops may comprise at least one conductive winding, generally composed of an electrically conductive substance such as copper or aluminum.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

Furthermore, additional features and advantages of the present disclosure will be appreciated by those skilled in the art.

In addition, the embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

Moreover, the previous detailed description is provided to enable any person skilled in the art to make or use the present invention. Various modifications to those embodiments will be readily apparent to those skilled in the art, and the generic principles defined herein may be applied to other embodiments without departing from the spirit or scope of the invention described herein. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

Furthermore, nothing herein is intended as an admission of prior art or of common general knowledge. In addition, citation or identification of any document in this application is not an admission that such document is available as prior art, or that any reference forms a part of the common general knowledge in the art.

What is claimed:

1. An apparatus for airborne electromagnetic surveying, the apparatus comprising:
    a rigid central hub having a vertical extent and defining an equatorial plane;
    a transmitter loop disposed around the rigid central hub;
    a plurality of radials connecting the rigid central hub and the transmitter loop, a distal end of each radial being connected to the transmitter loop at a transmitter loop connection point and a proximal end of each radial being connected to the hub at a hub connection point;
    the transmitter loop comprising:
    a plurality of substantially rigid loop sections connected in an end-to-end manner with joints, wherein a plurality of the joints are flexible joints and the loop sections are disposed to lie in a transmitter loop plane during flight and may flex out of the transmitter loop plane at the flexible joints during lift-offs and landings,
    wherein, each loop section comprises one or more current conducting elements electrically connected to current conducting elements in an adjacent loop section to collectively form a transmitter loop circuit into which current may be driven by a transmitter, and
    wherein the proximal end of at least one radial connects to a hub connection point that is substantially offset from the transmitter loop plane along the vertical extent of the rigid central hub, whereby the offsetting contributes to the stability of the transmitter loop connection point in an up-down direction relative to the equatorial plane of the hub, and
    wherein the transmitter loop plane and the equatorial plane of the hub are substantially parallel during flight.

2. The apparatus of claim 1 wherein at least one of the radials is a rigid radial.

3. The apparatus of claim 2 wherein the rigid radial is a truss, the truss comprising a plurality of spars, the plurality of spars comprising an upper spar connected at its proximal end to the hub at an upper hub connection point located at or above the equatorial plane of the hub, and a lower spar connected at its proximal end to the hub at a lower hub connection point located at or below the equatorial plane of the hub, and wherein distal ends of the upper and lower spars are conjoined for connection at a transmitter loop connection point, whereby the truss resists upward and downward movement of the transmitter loop connection point relative to the equatorial plane of the hub.

4. The apparatus of claim 3 wherein at least one rigid radial truss is pivotally connected to the rigid central hub so that the distal end of the pivoting rigid radial truss may move into a position raised above the equatorial plane of the rigid central hub.

5. The apparatus of claim 4, further comprising a biasing mechanism for biasing the distal end of the pivoting rigid radial truss towards the equatorial plane of the hub.

6. The apparatus of claim 5, wherein the biasing mechanism selectively provides a variable biasing force to adjust the flexibility of movement of the pivoting rigid radial truss relative to the rigid central hub.

7. The apparatus according to claim 3, comprising a plurality of rigid radial trusses including a pivoting first rigid radial truss connected to the transmitter loop at a leading end of the transmitter loop, and a second rigid radial truss connected to the transmitter loop at the trailing section of the transmitter loop.

8. The apparatus of claim 7 wherein the pivoting rigid radial truss comprises at least one upper and two lower spars, wherein the distal ends of the upper and lower spars are conjoined for connection at a transmitter loop connection point, and wherein the proximal end of the upper spar is pivotally connected to an upper region of the hub, and wherein the proximal ends of the lower spars are variably connected to one or more lower regions of the hub to allow a distance between the transmitter loop connection point and the lower region of the hub to change in response to upward or downward movement of the pivoting rigid radial truss relative to the equatorial plane of the hub.

9. The apparatus of claim 1 wherein a flexible joint is a hinged joint, the hinged joint comprising first and second hinge members rotatably connected with a hinge pin defining a hinge axis, wherein the hinge axis lies substantially in the transmitter loop plane.

10. The apparatus of claim 9 comprising a plurality of hinged joints, wherein the hinge axes of the joints are oriented substantially perpendicular to a longitudinal axis of the transmitter loop, the longitudinal axis extending between leading and trailing ends of the transmitter loop.

11. The apparatus of claim 10 wherein a plurality of transmitter loop connection points are located at the hinged joints of the transmitter loop.

12. The apparatus of claim 9 further comprising a bushing rotatably engaged with the hinge pin for rotation about the pin independently of the first and second hinge members.

13. The apparatus of claim 12 wherein the bushing is connected to at least one of the plurality of radials, a chord, a lift rope, or a yoke.

14. The apparatus of claim 13 wherein the bushing is coupled to a yoke and the yoke is coupled to a rigid radial, the rigid radial extending between and connecting the hub at a hub connection point and the transmitter loop at a transmitter loop connection point.

15. The apparatus of claim 9 further comprising at least one biasing mechanism for biasing the angle formed by the first hinge member relative to the second hinge member.

16. The apparatus of claim 1, comprising a tow line, and a plurality of lift ropes connecting the transmitter loop and the hub to the tow line for suspending the apparatus from an aircraft.

17. The apparatus according to claim 1, wherein the hub comprises a closed, weatherproof shell.

18. The apparatus of claim 17, wherein the weatherproof shell contains a magnetometer, the magnetometer being connected to a controller and a data recorder.

19. The apparatus of claim 18, wherein the magnetometer is mounted on a stabilization system for stabilizing the motions of the magnetometer against motions of the hub.

20. The apparatus of claim 18 wherein a bucking coil is located at the rigid central hub substantially in its equatorial plane for bucking a primary magnetic field of the transmitter loop circuit within the shell, wherein the bucking coil is serially connected to the transmitter loop circuit.

21. The apparatus according to claim 1, comprising a plurality of distinct transmitter loop circuits.

22. A loop section for forming part of an apparatus for airborne electromagnetic surveying, the loop section comprising:
- a plurality of rigid conductive elements extending between first and second ends of the section, the conductive elements capable of conducting electrical current;
- at least one frame for securely retaining the rigid conductive elements in a spaced apart relationship, the frame comprising non-conductive material for providing electrical isolation between the rigid conductive elements; and
- a section terminator connected to a frame and extending from an end the loop section for connecting to an adjacent loop section at a joint.

23. The loop section of claim 22 comprising:
- at least a first and a second frame, where the first frame is disposed towards one end of the loop section and the second frame is disposed towards the opposite end of the loop section; and
- a first section terminator disposed at the first end of the loop section and supported by the first frame, and a second section terminator disposed at the second end of the loop section and supported by the second frame, wherein each of the first and second section terminators is connectable to an adjacent loop section.

* * * * *